(12) United States Patent
Ghotge et al.

(10) Patent No.: US 7,823,032 B2
(45) Date of Patent: Oct. 26, 2010

(54) DATA RECORDING/REPRODUCTION FOR WRITE-ONCE DISCS

(75) Inventors: Vishal V. Ghotge, Seattle, WA (US); Ravinder S Thind, Kirkland, WA (US); Yoshiho Gotoh, Osaka (JP); Rajeev Y. Nagar, Sammamish, WA (US); Garret J. Buban, Carnation, WA (US); Sarosh C. Havewala, Redmond, WA (US)

(73) Assignees: Panasonic Corporation, Osaka (JP); Microsoft Corporation, Redmond, WA (US)

( * ) Notice: Subject to any disclaimer, the term of this patent is extended or adjusted under 35 U.S.C. 154(b) by 818 days.

(21) Appl. No.: 10/597,859

(22) PCT Filed: May 9, 2005

(86) PCT No.: PCT/JP2005/008825
§ 371 (c)(1),
(2), (4) Date: Apr. 23, 2007

(87) PCT Pub. No.: WO2005/109425
PCT Pub. Date: Nov. 17, 2005

(65) Prior Publication Data
US 2008/0192595 A1 Aug. 14, 2008

Related U.S. Application Data

(60) Provisional application No. 60/569,537, filed on May 10, 2004, provisional application No. 60/577,616, filed on Jun. 7, 2004, provisional application No. 60/663,791, filed on Mar. 21, 2005, provisional application No. 60/668,237, filed on Apr. 4, 2005.

(51) Int. Cl.
*G26F 3/00* (2006.01)
*G06F 11/00* (2006.01)
*G11B 7/00* (2006.01)

(52) U.S. Cl. .................. 714/723; 714/8; 369/53.24
(58) Field of Classification Search ............ 714/8, 714/723, 710; 369/47.1, 53.1, 53.15, 53.17, 369/275.3, 53.24
See application file for complete search history.

(56) References Cited

U.S. PATENT DOCUMENTS 5,233,584 A * 8/1993 Kulakowski et al. ..... 369/44.27
(Continued)

FOREIGN PATENT DOCUMENTS

EP 0490400 A1 8/1992
WO 2004/029968 4/2004

OTHER PUBLICATIONS

International Search Report for corresponding Application No. PCT/JP2005/08825 mailed Oct. 17, 2005.
(Continued)

*Primary Examiner*—Phung M Chung
(74) *Attorney, Agent, or Firm*—Renner, Otto, Boisselle & Sklar, LLP

(57) ABSTRACT

The recording method of the present invention includes the steps of: receiving a write instruction which specifies at least a logical sector in which data is to be written; determining whether the logical sector corresponds to a recorded physical sector or an unrecorded physical sector; when it is determined that the logical sector corresponds to an unrecorded physical sector, writing the data into the unrecorded physical sector, determining whether a verification of the data which has been written into a physical sector is successful, if the verification of the data that has been written is not successful, writing the data into an unrecorded physical sector, generating a remapping table including remapping information which remaps an original address of the physical sector corresponding to the logical sector to a remapping address of the selected physical sector, and writing the remapping table on the write-once disc.

11 Claims, 20 Drawing Sheets

U.S. PATENT DOCUMENTS

| | | | | |
|---|---|---|---|---|
| 5,905,858 | A | * | 5/1999 | Jeddeloh ........................ 714/52 |
| 7,203,153 | B2 | * | 4/2007 | Kuraoka et al. ........... 369/275.3 |
| 7,414,938 | B2 | * | 8/2008 | Kuraoka et al. ............. 369/53.1 |
| 2005/0169147 | A1 | * | 8/2005 | Kobayashi et al. ....... 369/53.35 |
| 2006/0044979 | A1 | * | 3/2006 | Kuraoka et al. ........... 369/53.17 |
| 2008/0232210 | A1 | * | 9/2008 | Buban et al. .............. 369/47.13 |
| 2008/0310289 | A1 | * | 12/2008 | Gotoh et al. .............. 369/275.3 |

OTHER PUBLICATIONS

Takashi Yokozeki et al.; "A Virtual Optical Disk Method to Realize Rewritability and Revision Control on a Write-Once Optical Disk"; Systems & Computers in Japan; Scripta Technica Journals; New York, US; vol. 21, No. 8; Jan. 1990; pp. 34-43, XP000177819.

T10 Technical Committee; "Information Technology—SCSI-3 Block Commands (SBC)"; Nov. 1997; pp. 65-66, and 75-80; XP002346890.

Optical Storage Technology Association (OSTA); "Universal Disk Format Specification, Revision 2.50"; Apr. 2003; pp. 33-45; XP002344951.

Office Action for corresponding European Application No. 05739075.9 dated Feb. 26, 2010.

* cited by examiner

DATA RECORDING/REPRODUCTION FOR WRITE-ONCE DISCS

TECHNICAL FIELD

The present invention relates to a recording method and apparatus for a write-once disc using a logical overwritable mechanism, a reproduction method and apparatus, and a semiconductor integrated circuit for use in the recording apparatus or the reproduction apparatus.

BACKGROUND ART

File systems for optical discs have made advances through various activities to develop UDF (Universal Disk Format®) specifications published from OSTA (Optical Storage Technology Association).

For write-once discs, the recording method has improved from multi-session recording to file-by-file recording using VAT (Virtual Allocation Table).

On the other hand, for rewritable discs, a volume and file structure has improved from the structure using non-sequential recording defined in ECMA 167, which is the international standard, to the structure using Metadata Partition specified in UDF Revision 2.5 (hereinafter UDF 2.5). The merits to use Metadata Partition are the improvement in the performance to retrieve metadata, such as file entries/directories, and to increase the robustness from media damage.

However, Metadata Partition cannot be used for data appending usage on a write-once disc. This is because it is not allowed in UDF 2.5 to use Metadata Partition with VAT, due to the difficulty to implement this combination.

Typically, it is also difficult to develop a new recording method for a write-once disc. This comes from the physical characteristics such as that the data written at once can not be overwritten, hence it would be required to study from the several aspects, to be consistent with computer architecture, the possibility of implementation for drive apparatus, the restrictions due to the dedicated resource of consumer appliances, etc.

The present invention has been made in view of the above subjects and includes an objective of providing the merits of Metadata Partition to the data recording usage on a write-once disc.

DISCLOSURE OF THE INVENTION

A recording method according to the present invention for writing data on a write-once disc having a plurality of physical sectors, the write-once disc including a volume space having a plurality of logical sectors, each of the plurality of logical sectors corresponding to one of the plurality of physical sectors, includes: receiving a write instruction which specifies at least a logical sector in which data is to be written; determining whether the logical sector specified by the write instruction corresponds to a recorded physical sector or an unrecorded physical sector; when it is determined that the logical sector specified by the write instruction corresponds to an unrecorded physical sector, writing the data into the unrecorded physical sector, determining whether a verification of the data which has been written into a physical sector is successful, when it is determined that the verification of the data that has been written is not successful, writing the data into an unrecorded physical sector other than the physical sector in which the verification of the written data is not successful, the unrecorded physical sector being selected from the plurality of physical sectors corresponding to the plurality of logical sectors in the volume space, generating a remapping table including remapping information which remaps an original address of the physical sector corresponding to the logical sector specified by the write instruction to a remapping address of the selected physical sector, and writing the remapping table on the write-once disc; and when it is determined that the logical sector specified by the write instruction corresponds to a recorded physical sector, writing the data into an unrecorded physical sector other than the recorded physical sector, the unrecorded physical sector being selected from the plurality of physical sectors corresponding to the plurality of logical sectors in the volume space, determining whether a verification of the data which has been written into a physical sector is successful, when it is determined that the verification of the data that has been written is not successful, writing the data into an unrecorded physical sector other than the physical sector in which the verification of the written data is not successful, the unrecorded physical sector being selected from the plurality of physical sectors corresponding to the plurality of logical sectors in the volume space, generating a remapping table including remapping information which remaps an original address of the physical sector corresponding to the logical sector specified by the write instruction to a remapping address of the selected physical sector, and writing the remapping table on the write-once disc.

In an embodiment of the present invention, the data is written sequentially in a track assigned on the write-once disc, the track having a plurality of physical sectors, and the selected unrecorded physical sector is a physical sector designated by a next writable address within a track.

In an embodiment of the present invention, the method further includes the steps of: receiving a query for the next writable address within a track; and providing information indicating the next writable address within a track in response to the query.

In an embodiment of the present invention, the remapping table is included in at least a part of a defect list which describes at least one defective physical sector.

In an embodiment of the present invention, the defect list is written into an unrecorded physical sector corresponding to a logical sector in the volume space.

In an embodiment of the present invention, the method further includes the step of allocating at least one of a border-in area and a border-out area in the volume space, and wherein the defect list is written into the at least one of the border-in area and the border-out area allocated in the volume space.

According to another aspect of the present invention a recording apparatus is provided for writing data on a write-once disc having a plurality of physical sectors, the write-once disc including a volume space having a plurality of logical sectors, each of the plurality of logical sectors corresponding to one of the plurality of physical sectors, the recording apparatus including: a drive mechanism for performing a recording operation for the write-once disc; and a drive control section for controlling the drive mechanism; wherein: the drive control section is operable to: receive a write instruction which specifies at least a logical sector in which data is to be written; and determine whether the logical sector specified by the write instruction corresponds to a recorded physical sector or an unrecorded physical sector; when it is determined that the logical sector specified by the write instruction corresponds to an unrecorded physical sector, the drive control section controls the drive mechanism to, write the data into the unrecorded physical sector, and determine whether a verification of the data which has been written into a physical sector is successful, when it is determined that the verification of the data that has been written is not successful, the drive control section controls the drive mechanism to, write the data into an unrecorded physical sector other than the physical sector in which the verification of the written data is not successful, the unrecorded physical sector being selected from the plurality of physical sectors corresponding to the plurality of logical sectors in the volume space, generate a remapping table including remapping information which remaps an original address of the physical sector corresponding to the logical sector specified by the write instruction to a remapping address of the selected physical sector, and write the remapping table on the write-once disc; and when it is determined that the logical sector specified by the write instruction corresponds to a recorded physical sector, the drive control section controls the drive mechanism to write the data into an unrecorded physical sector other than the recorded physical sector, the unrecorded physical sector being selected from the plurality of physical sectors corresponding to the plurality of logical sectors in the volume space, and determine whether a verification of the data which has been written into a physical sector is successful, when it is determined that the verification of the data that has been written is not successful, the drive control section controls the drive mechanism to, write the data into an unrecorded physical sector other than the physical sector in which the verification of the written data is not successful, the unrecorded physical sector being selected from the plurality of physical sectors corresponding to the plurality of logical sectors in the volume space, generate a remapping table including remapping information which remaps an original address of the physical sector corresponding to the logical sector specified by the write instruction to a remapping address of the selected physical sector, and write the remapping table on the write-once disc.

According to another aspect of the present invention a semiconductor integrated circuit is provided for use in a recording apparatus for writing data on a write-once disc having a plurality of physical sectors, the write-once disc including a volume space having a plurality of logical sectors, each of the plurality of logical sectors corresponding to one of the plurality of physical sectors, the semiconductor integrated circuit is configured to control a drive mechanism for performing a recording operation for the write-once disc, the semiconductor integrated circuit is operable to: receive a write instruction which specifies at least a logical sector in which data is to be written; and determines whether the logical sector specified by the write instruction corresponds to a recorded physical sector or an unrecorded physical sector; when it is determined that the logical sector specified by the write instruction corresponds to an unrecorded physical sector, the semiconductor integrated circuit controls the drive mechanism to; write the data into the unrecorded physical sector, determines whether a verification of the data which has been written into a physical sector is successful, when it is determined that the verification of the data that has been written is not successful, the semiconductor integrated circuit controls the drive mechanism to; write the data into an unrecorded physical sector other than the physical sector in which the verification of the written data is not successful, the unrecorded physical sector being selected from the plurality of physical sectors corresponding to the plurality of logical sectors in the volume space, generate a remapping table including remapping information which remaps an original address of the physical sector corresponding to the logical sector specified by the write instruction to a remapping address of the selected physical sector, and write the remapping table on the write-once disc; and when it is determined that the logical sector specified by the write instruction corresponds to a recorded physical sector, the semiconductor integrated circuit controls the drive mechanism to: write the data into an unrecorded physical sector other than the recorded physical sector, the unrecorded physical sector being selected from the plurality of physical sectors corresponding to the plurality of logical sectors in the volume space, and determine whether a verification of the data which has been written into a physical sector is successful, when it is determined that the verification of the data that has been written is not successful, the semiconductor integrated circuit controls the drive mechanism to: write the data into an unrecorded physical sector other than the physical sector in which the verification of the written data is not successful, the unrecorded physical sector being selected from the plurality of physical sectors corresponding to the plurality of logical sectors in the volume space, generate a remapping table including remapping information which remaps an original address of the physical sector corresponding to the logical sector specified by the write instruction to a remapping address of the selected physical sector, and write the remapping table on the write-once disc.

According to another aspect of the present invention a recording method for writing data on a write-once disc having a plurality of physical sectors, the write-once disc including a volume space having a plurality of logical sectors, each of the plurality of logical sectors corresponding to one of the plurality of physical sectors, the recording method including the steps of: in response to a first write instruction which specifies at least a logical sector in which data is to be written, writing the data into the physical sector corresponding to the logical sector specified by the first write instruction, determining whether a verification of the data which has been written into a physical sector is successful, when it is determined that the verification of the data that has been written is not successful, writing the data into an unrecorded physical sector other than the physical sector in which the verification of the written data is not successful, the unrecorded physical sector being selected from the plurality of physical sectors corresponding to the plurality of logical sectors in the volume space, generating a remapping table including remapping information which remaps an original address of the physical sector corresponding to the logical sector specified by the first write instruction to a remapping address of the selected physical sector, and writing the remapping table on the write-once disc; and in response to a second write instruction which specifies at least a logical sector in which data is to be written, writing the data into an unrecorded physical sector other than the physical sector corresponding to the logical sector specified by the second write instruction, the unrecorded physical sector being selected from the plurality of physical sectors corresponding to the plurality of logical sectors in the volume space, determining whether a verification of the data which has been written into a physical sector is successful, when it is determined that the verification of the data that has been written is not successful, writing the data into an unrecorded physical sector other than the physical sector in which the verification of the written data is not successful, the unrecorded physical sector being selected from the plurality of physical sectors corresponding to the plurality of logical sectors in the volume space, generating a remapping table including remapping information which remaps an original address of the physical sector corresponding to the logical sector specified by the second write instruction to a remapping address of the selected physical sector, and writing the remapping table on the write-once disc.

According to another aspect of the present invention a recording apparatus is provided for writing data on a write-once disc having a plurality of physical sectors, the write-once disc including a volume space having a plurality of logical sectors, each of the plurality of logical sectors corresponding to one of the plurality of physical sectors, the recording apparatus including: a drive mechanism for performing a recording operation for the write-once disc; and a drive control section for controlling the drive mechanism; wherein: the drive control section is operable to: in response to a first write instruction which specifies at least a logical sector in which data is to be written, the drive control section controls the drive mechanism to, write the data into the physical sector corresponding to the logical sector specified by the first write instruction, and determine whether a verification of the data which has been written into a physical sector is successful, when it is determined that the verification of the data that has been written is not successful, the drive control section controls the drive mechanism to: write the data into an unrecorded physical sector other than the physical sector in which the verification of the written data is not successful, the unrecorded physical sector being selected from the plurality of physical sectors corresponding to the plurality of logical sectors in the volume space, generate a remapping table including remapping information which remaps an original address of the physical sector corresponding to the logical sector specified by the first write instruction to a remapping address of the selected physical sector, and write the remapping table on the write-once disc; and in response to a second write instruction which specifies at least a logical sector in which data is to be written, the drive control section controls the drive mechanism to: write the data into an unrecorded physical sector other than the physical sector corresponding to the logical sector specified by the second write instruction, the unrecorded physical sector being selected from the plurality of physical sectors corresponding to the plurality of logical sectors in the volume space, and determine whether a verification of the data which has been written into a physical sector is successful, when it is determined that the verification of the data that has been written is not successful, the drive control section controls the drive mechanism to, write the data into an unrecorded physical sector other than the physical sector in which the verification of the written data is not successful, the unrecorded physical sector being selected from the plurality of physical sectors corresponding to the plurality of logical sectors in the volume space, generate a remapping table including remapping information which remaps an original address of the physical sector corresponding to the logical sector specified by the second write instruction to a remapping address of the selected physical sector, and write the remapping table on the write-once disc.

According to another aspect of the present invention a semiconductor integrated circuit is provided for use in a recording apparatus for writing data on a write-once disc having a plurality of physical sectors, the write-once disc including a volume space having a plurality of logical sectors, each of the plurality of logical sectors corresponding to one of the plurality of physical sectors, the semiconductor integrated circuit is configured to control a drive mechanism for performing a recording operation for the write-once disc, the semiconductor integrated circuit is operable to: in response to a first write instruction which specifies at least a logical sector in which data is to be written, the semiconductor integrated circuit controls the drive mechanism to: write the data into the physical sector corresponding to the logical sector specified by the first write instruction, and determine whether a verification of the data which has been written into a physical sector is successful, when it is determined that the verification of the data that has been written is not successful, the semiconductor integrated circuit controls the drive mechanism to: write the data into an unrecorded physical sector other than the physical sector in which the verification of the written data is not successful, the unrecorded physical sector being selected from the plurality of physical sectors corresponding to the plurality of logical sectors in the volume space, generating a remapping table including remapping information which remaps an original address of the physical sector corresponding to the logical sector specified by the first write instruction to a remapping address of the selected physical sector, writing the remapping table on the write-once disc; in response to a second write instruction which specifies at least a logical sector in which data is to be written, the semiconductor integrated circuit controls the drive mechanism to, write the data into an unrecorded physical sector other than the physical sector corresponding to the logical sector specified by the second write instruction, the unrecorded physical sector being selected from the plurality of physical sectors corresponding to the plurality of logical sectors in the volume space, and determine whether a verification of the data which has been written into a physical sector is successful, when it is determined that the verification of the data that has been written is not successful, the semiconductor integrated circuit controls the drive mechanism to: write the data into an unrecorded physical sector other than the physical sector in which the verification of the written data is not successful, the unrecorded physical sector being selected from the plurality of physical sectors corresponding to the plurality of logical sectors in the volume space, generate a remapping table including remapping information which remaps an original address of the physical sector corresponding to the logical sector specified by the second write instruction to a remapping address of the selected physical sector, and write the remapping table on the write-once disc.

BEST MODE FOR CARRYING OUT THE INVENTION

An overwritable function for a write-once disc performed by drive apparatus has been studied. However, it was difficult to put it in practice, because the drive apparatus cannot know how much data will be overwritten and where the data will be overwritten.

For example, the data to be overwritten is stored in the other location as a write-once disc, and the information to specify the original location and the replacement location have to be handled in the drive apparatus. When the amount of overwritten data increases, it takes a longer time to search where it is replaced. Hence, such a drive apparatus could not read/write with enough performance due to its small resources (e.g. CPU speed and memory).

It is believed the new file system should distinguish the data to be overwritten and the data to be newly written, and the new file system can match with the drive apparatus which has an overwritable function. Then, the possibility to apply Metadata Partition for data appending usage on a write-once disc, without using VAT is found.

The strategic importance of this idea includes; by having the device handle the overwriting of existing blocks, the file system does not need to implement the logic. This reduces the complexity of the file system driver.

In the following embodiments, the investigations based on this idea are shown in detail.

Embodiment 1

The amount of the overwritten data can be reduced by optimizing the procedure in the file system. In this embodiment, the basic read/write operation is explained in accordance with the new recording method for the drive apparatus with the overwritable function of a write-once disc.

Hereinafter, embodiments of the present invention will be described with reference to the drawings.

Figure 1:
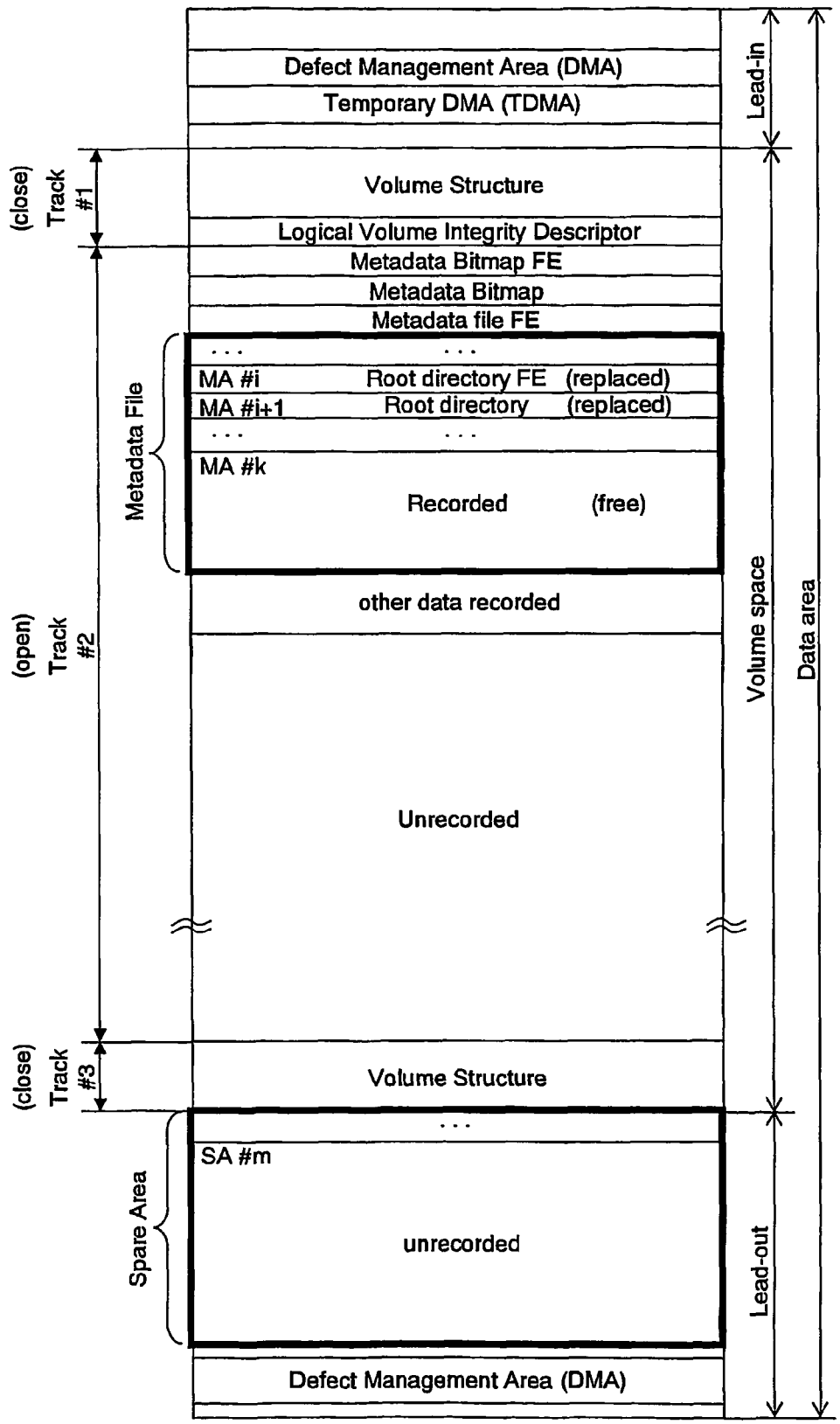
FIG. 1 is a diagram illustrating a configuration of areas when a file is recorded.
Figure 2:
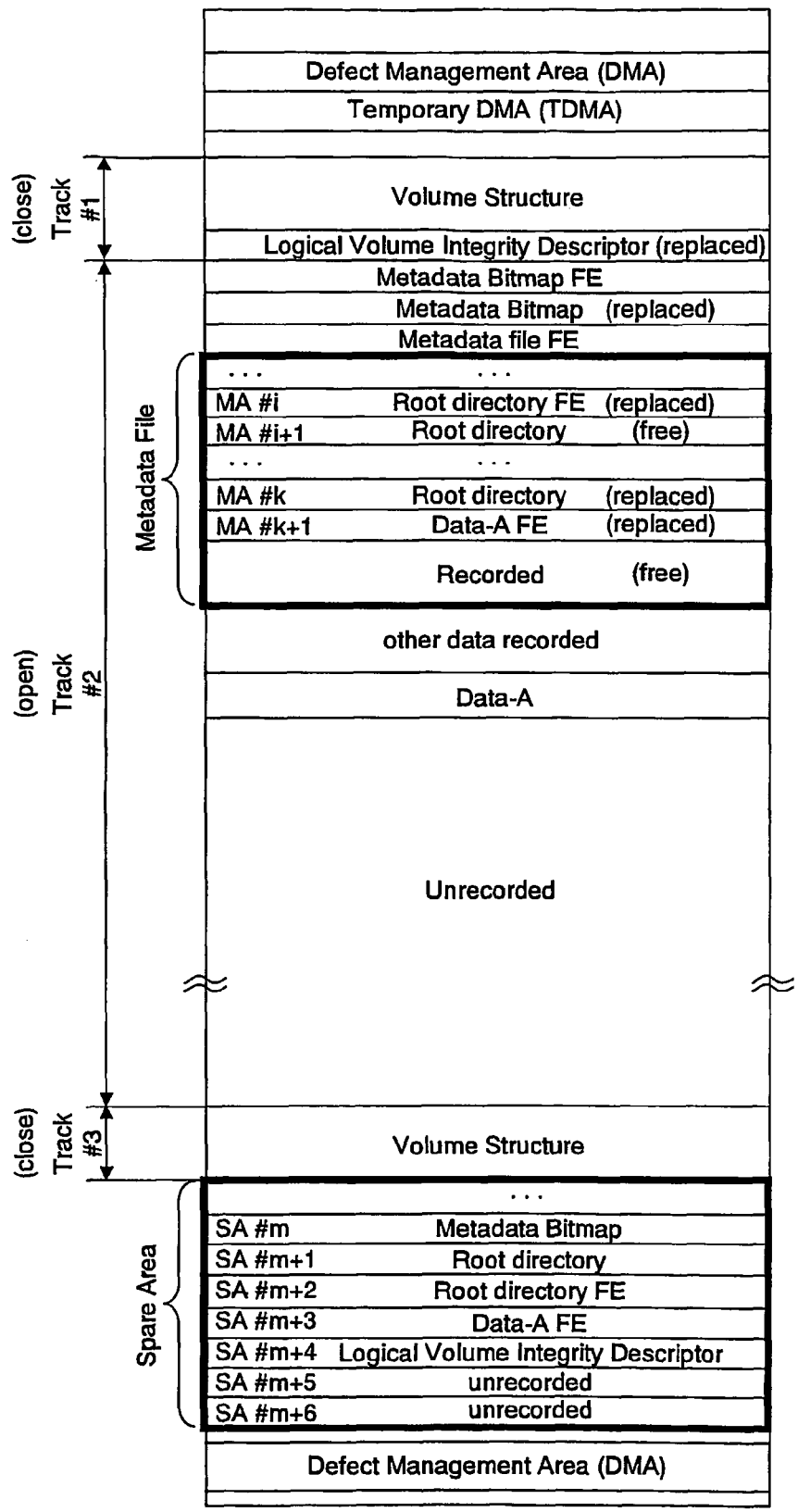
FIG. 2 is a diagram illustrating a configuration of areas when a Data-A file is recorded in a root directory of a disc having the state as shown in FIG. 1.
Figure 4:
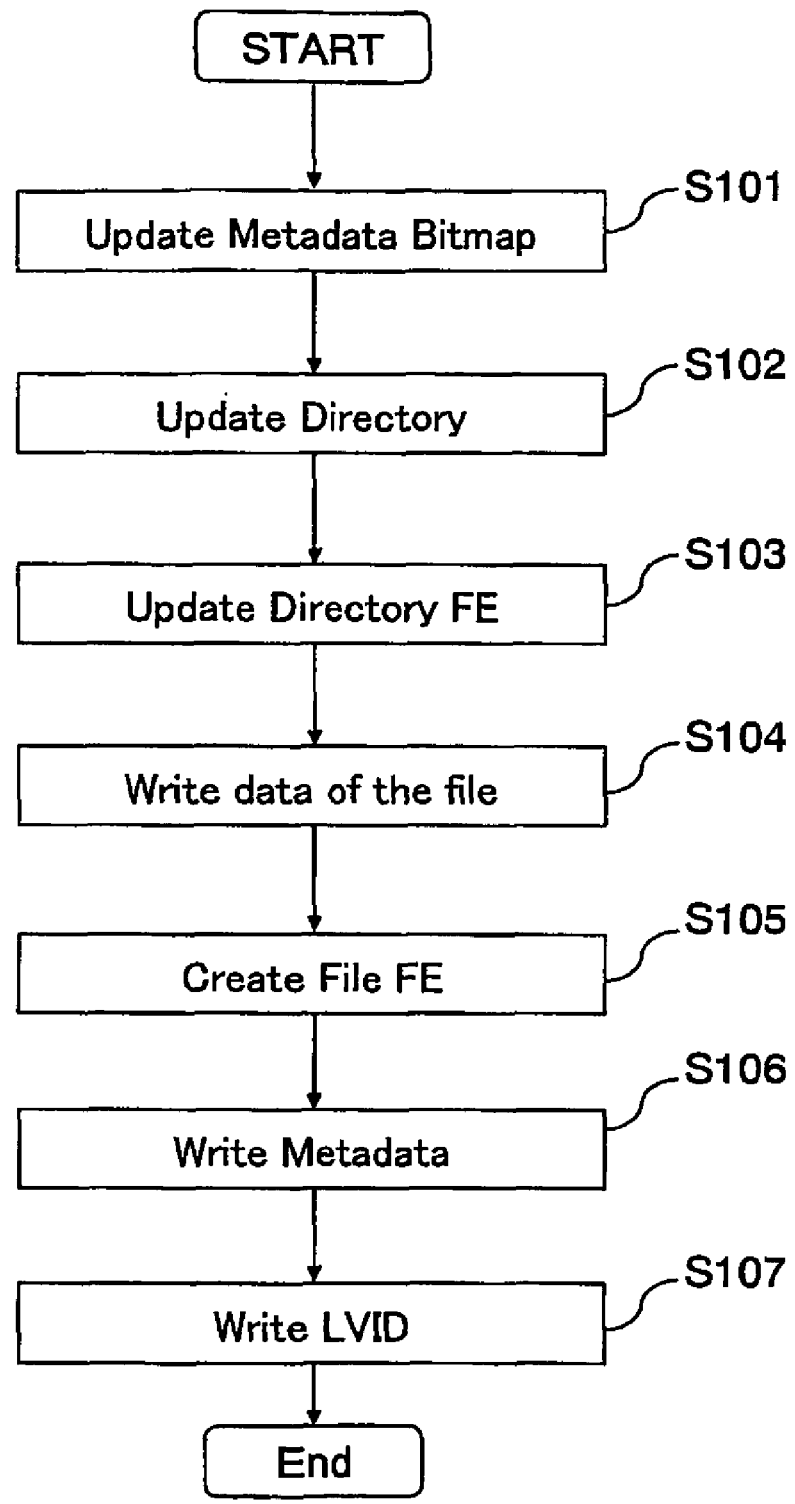
FIG. 4 is a flowchart illustrating a procedure for recording a file.

FIGS. 1 and 2 are diagrams showing a configuration of areas. FIG. 4 is a flowchart showing a procedure for recording a file. FIG. 1 shows the state where a file has been recorded after a logical format operation. FIG. 2 shows the state where a Data-A file has been recorded in a root directory on a disc having the state of FIG. 1.

Firstly, FIG. 1 will be described.

The data area includes the areas such as a Lead-in area, a volume space and a Lead-out area, (wherein the Lead-in area and the Lead-out area are managed by a physical layer). The physical sector is an addressable unit in the data area and the physical sector number is assigned in ascending sequence to each physical sector. The volume space consists of logical sectors and a logical sector number is assigned in ascending sequence to each logical sector. Each logical sector corresponds to the physical sector uniquely in advance. For example, the logical sector with a logical sector number 0 corresponds to the physical sector with physical sector number 10000 and the start address of the volume space is stored in the Lead-in area.

The defect Management Area (DMA) is an area, in which information indicating the correspondence between the address of a block to be replaced and the address of a replaced block in a replacement operation, is recorded as a defect list.

Temporary DMA (TDMA) is an area, in which a temporary defect list is recorded in an incremental write operation. When a disc is finalized to prohibit incremental write operations, a temporary defect list is registered as a defect list in DMA. DMA is provided in two portions of a disc, i.e., at an inner portion and at an outer portion. Thus, a defect list is recorded in different areas twice. In DMA, disc information, such as track information, positional information of a spare area, and the like, are recorded.

The spare area is a replacement area, in which data is recorded by a replacement operation, which is equivalent to a linear replacement method. The spare area is assigned outside a volume space which is handled by a file system. In this example, data has been recorded in a portion of the spare area. Addresses in the spare area are inherently specified by using physical addresses. To simplify the explanation, relative addresses in the spare area are indicated by SA's (Spare area Address). Sectors on and after SA #m are in the unrecorded state.

In the present invention, the linear replacement algorithm which is generally used for defect management is applied to overwriting performed by the drive apparatus.

The volume space consists of three tracks. A track is an area in which the data is recorded sequentially from the beginning of the track on a write-once disc. The end of recorded area in a track is managed by a drive apparatus. Track Status (Close and Open) indicates a status of a track. "Close" indicates that all sectors in a track have been used for data recording. "Open" indicates that there is a sector(s), which has not been used for data recording. In other words, data can be incrementally written into an open track.

(Volume Structure)

The volume and file structure complies with UDF 2.5. A volume structure, which is located at an area having a smaller logical sector number, includes Anchor Volume Descriptor Pointer, Volume Recognition Sequence, Volume Descriptor Sequence, and Logical Volume Integrity Sequence. A volume structure, which is located at an area having a larger logical sector number, includes Anchor Volume Descriptor Pointer and Volume Descriptor Sequence. The Logical Volume Integrity Sequence, in which a Logical Volume Integrity Descriptor is recorded, is a part of a volume structure. However, for convenience of explanation in this example, the Logical Volume Integrity Descriptor is explicitly described under the volume structure. Since the volume structure has been previously recorded, Tracks #1 and #3 are in the close state. The area described as Track #2 is assigned as a partition specified by UDF. The Metadata file is also called a Metadata partition. To distinguish it from the Metadata partition, Track #2 area is called a physical partition. In the Metadata file, an unused area is recorded in advance. Track #2 is an area for recording file data. Therefore, an area following the recorded area is in the unrecorded state.

(File Structure)

Metadata Bitmap FE (Metadata Bitmap file File Entry) is a file entry for organizing the areas allocated for a Metadata Bitmap. Metadata Bitmap is a bitmap for specifying available sectors which are ready for use in a Metadata file. Not only unrecorded areas, but also an area which becomes an unused area by deleting a file entry or a directory, are registered in the bitmap as available areas. Metadata file FE (Metadata file File Entry) is a file entry for organizing the areas allocated for a Metadata file. In a Metadata file, file entries and directories are recorded. In UDF, a File Set Descriptor is also recorded, which is not shown in the figure.

Root directory FE (root directory file entry) is a file entry for organizing the areas allocated for the root directory. A root directory FE is recorded in MA #i. A root directory is recorded in MA #i+1. Though not shown, the root directory FE and the root directory are actually stored physically in sectors in the spare area. Information indicating which sector in the spare area replaces a root directory FE and a root directory is recorded in TDMA. MA (Metadata file Address) indicates a relative address within a Metadata file. Since a file(s) have been previously recorded, areas on and after MA #k are available.

(File Recording Procedure)

An exemplary procedure for recording a Data-A file onto the write-once disc of FIG. 1 will be described with reference to FIGS. 2 and 4.

In step S101, the Metadata Bitmap is read into a memory and is updated in the memory to obtain a recording area in the Metadata file.

In step S102, a directory, under which a file is to be registered, is read into the memory, and is updated in the memory. In this example, the root directory is read out, and the Data-A file is registered.

In step S103, the file entry of the directory is read into the memory, and information (e.g., size and update time, etc.) of the directory is updated.

In step S104, the Data-A file data is recorded from the beginning of the unrecorded area in Track #2.

In step S105, in order to register the positional information of the recorded data, the file entry of the file is generated in the memory.

In step S106, the data updated or generated in the memory is recorded. In the example of FIG. 2, a drive apparatus is instructed to record the Metadata Bitmap file in the same place. Since the specified area is an already-recorded area, the drive apparatus records data at SA #m, which is the beginning of the unrecorded area in the spare area. It is instructed that the root directory is recorded at MA #k. Therefore, the root directory recorded at MA #i+1 becomes invalid, and the sector at MA #i+1 becomes an available sector in a logical space. Even if it is instructed that data is recorded into an available area in the Metadata file, the data cannot be recorded into the area, since the all area in the Metadata file is already recorded in advance. Therefore, the data of the root directory is recorded into SA #m+1 in the spare area by a replacement operation.

The replacement operation is a pseudo-overwrite operation of the present invention. As used herein, the term "pseudo-overwrite operation" refers to a logical overwrite operation, in which the mechanism of a replacement operation is used to write the data into the unrecorded area in response to an instruction to write the data into an already recorded area.

It is instructed that the file entry of the root directory is written into MA #i. In this case, MA #i is an already-recorded area. Therefore, the data is stored into SA #m+2 in the spare area by a pseudo-overwrite operation. It is instructed that the file entry of the Data-A file is written into MA #k+1. The data is stored into SA #m+3 by a pseudo-overwrite operation.

In step S107, it is instructed that the Logical Volume Integrity Descriptor is updated to indicate the integrity state of the file structure. The data is stored into SA #m+4 by a pseudo-overwrite operation.

Figure 5:
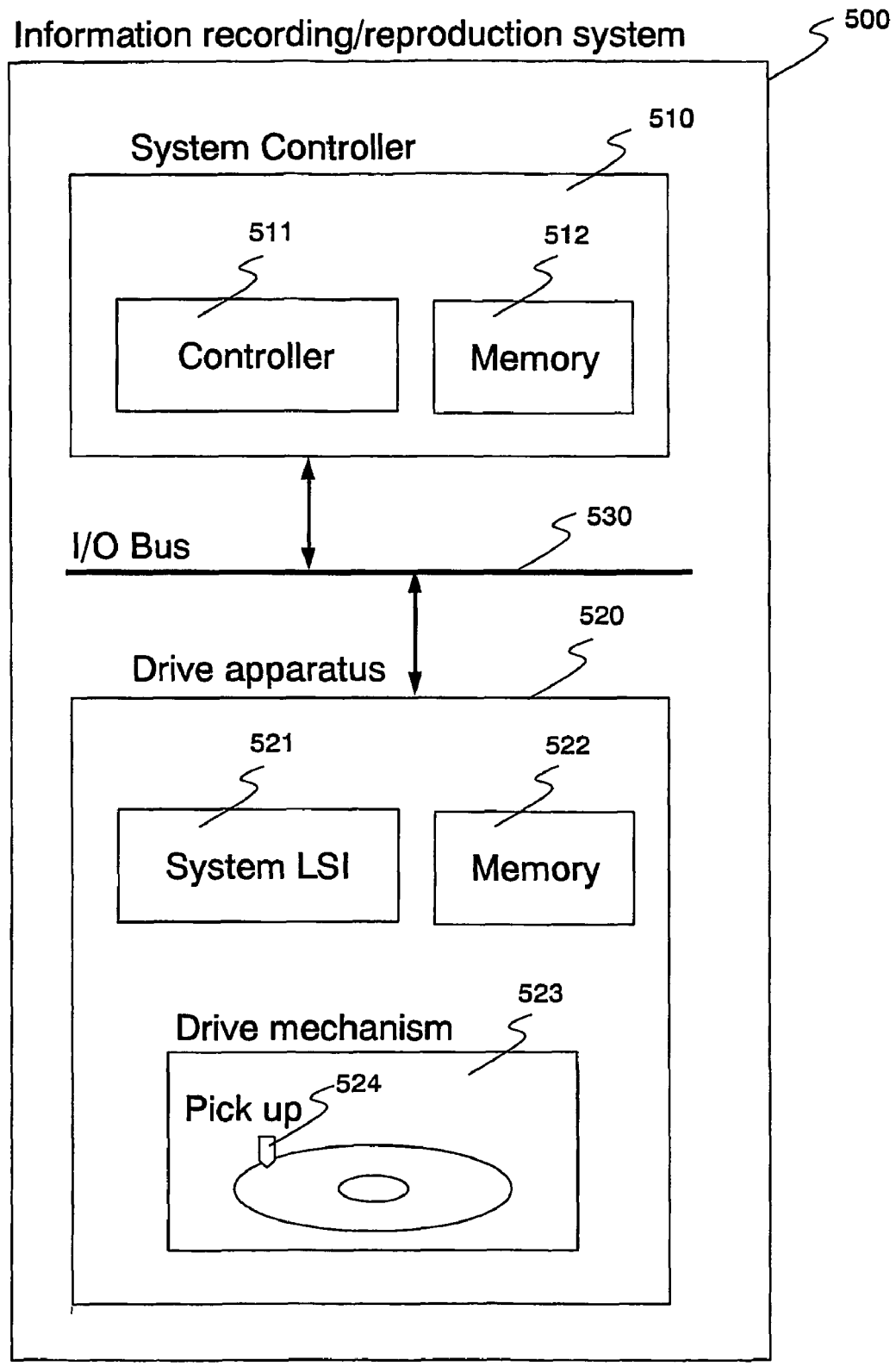
FIG. 5 is a diagram illustrating an optical disc information recording/reproduction system.

FIG. 5 shows an optical disc information recording/reproduction system 500 according to the present invention. The information recording/reproduction system 500 includes a system controller 510, a drive apparatus 520 for reading and writing information from and onto an optical disc, and an input/output bus 530.

Between the system controller 510 and the drive apparatus 520, instructions and responses using a command set and transfer of the read/write data are performed through the input/output bus 530.

The system controller 510 includes a controller 511 and a memory 512. The system controller 510 may be a personal computer. The controller 511 may be, for example, a semiconductor integrated circuit such as a CPU (Central Processing Unit) and performs the method described in the embodiments of the present inventions.

Further, a program for causing the controller 511 to perform the method described in the embodiments is stored in the memory 512. In the controller 511, a file system, a utility program, or a device driver may be performed.

The drive apparatus 520 includes a system LSI 521, a memory 522 and a drive mechanism 523. A program for causing the system LSI 521 to perform the method described in the embodiments of the present inventions may be stored in the memory 522. The system LSI 521 may be formed on a semiconductor chip and may include a micro processor.

The drive mechanism 523 includes a mechanism for loading an optical disc, a pickup 524 for writing/reading the data from/onto a disc, a traverse mechanism for moving the pickup 524. The drive mechanism 523 is controlled by the system LSI 521.

As explained above, the data of a file can be recorded without being overwritten, some of metadata can be recorded using pseudo-overwrite. Typically, the size of metadata needed to update a file is smaller than the data size of the file, and then the size of data to be overwritten can be reduced. The size of a file entry is 2048 bytes, and the size of a directory depends on the number of files and the length of the file name. As an example, if each file name is 12 characters and 39 files are recorded in the directory, the directory information can be recorded within a sector of 2048 bytes. Therefore, the read/write operation can be realized basically for a write-once disc by combining the new recording method and the drive apparatus with the overwritten function.

Embodiment 2

This embodiment describes a further recording method to write a file onto a write-once disc on which the state is explained in embodiment 1 as FIG. 2.

In FIG. 2, the unrecorded area is only 2 sectors of SA #m+5 and #m+6, therefore, if the Metadata Bitmap and the root directory are written in the spare area, a file entry of the root directory, and a file entry of the file can not be written any more. Thus, an additional file can not be recorded, even if the Metadata Bitmap indicates available areas in the Metadata file, because the unrecorded area in the spare area is used up.

So, hereinafter a recording method to record the file with checking the size of unrecorded areas in the spare area is described.

Figure 3:
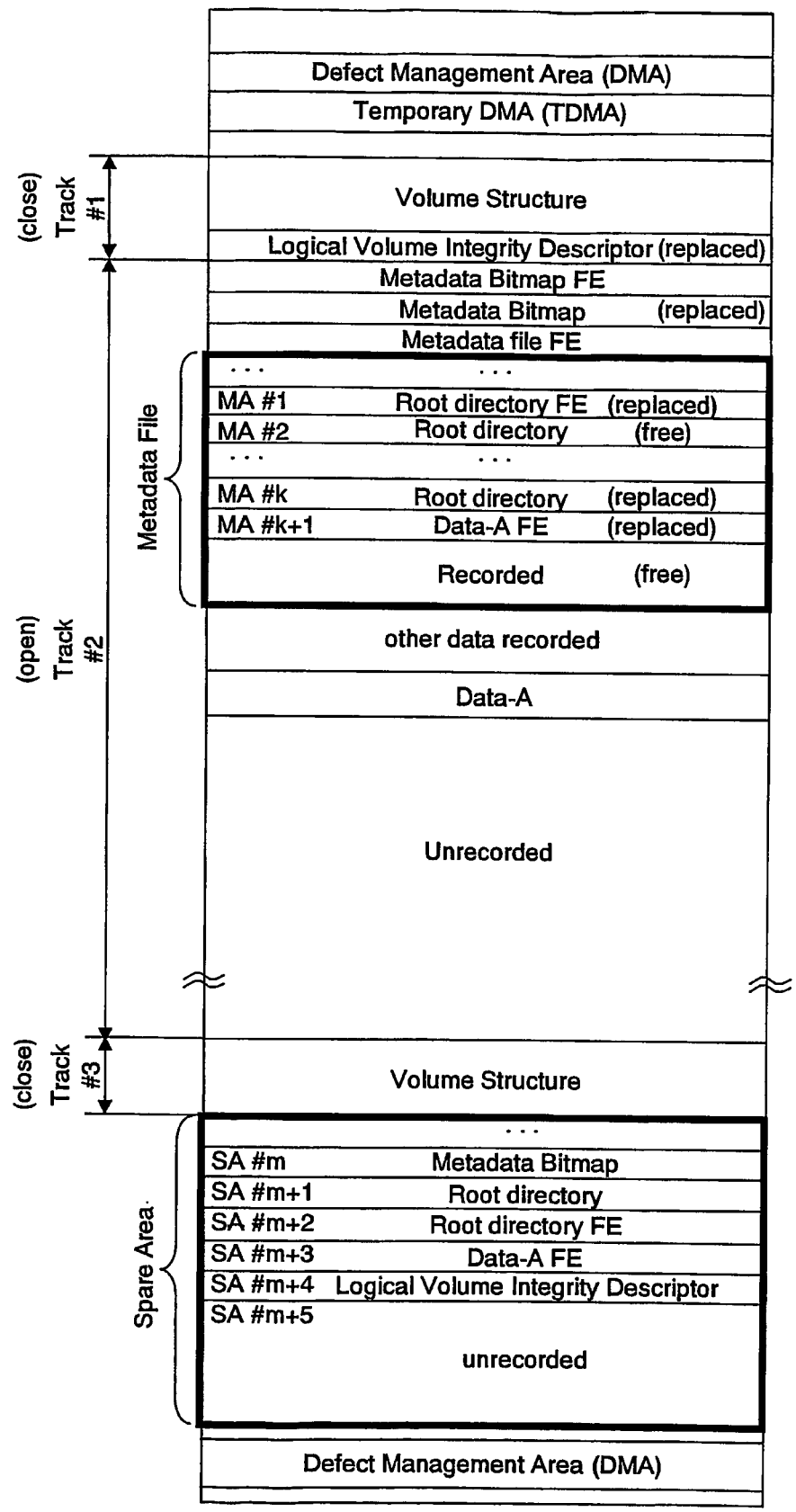
FIG. 3 is a diagram illustrating a configuration of areas when a Data-A file is recorded in a root directory of a disc having a larger spare area.

FIG. 3 is a diagram illustrating a configuration of areas on the disc on which the same data as shown in FIG. 2 is written. In FIG. 3, as a spare area with the larger size has been provided by a logical formatting operation, the spare area has a larger unrecorded area than that of FIG. 2.

Figure 6:
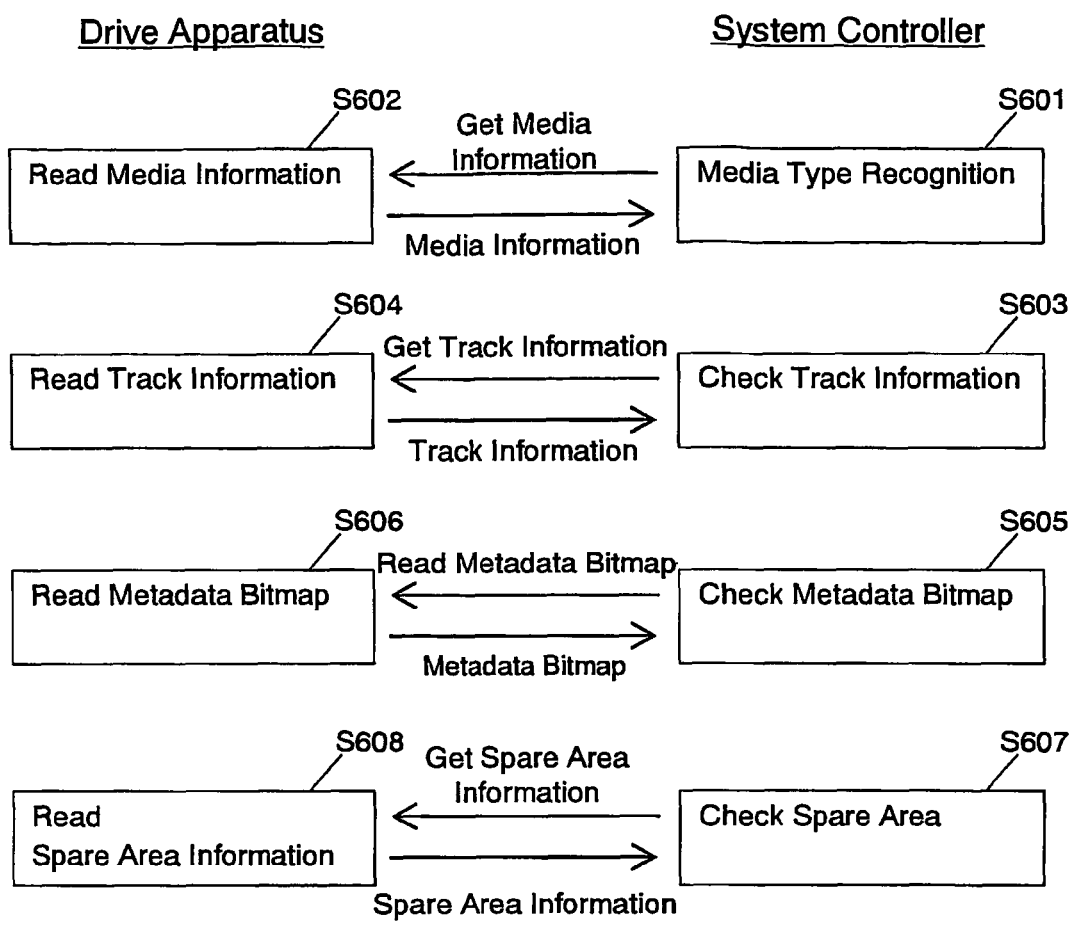
FIG. 6 is a diagram illustrating transfer of commands between a drive apparatus and a system controller.

FIG. 6 is a diagram illustrating data transfer with commands between a drive apparatus and a system controller. Specific commands can be applied to standards defined by ANSI (American National Standards Institute) or Multi-Media Command Set Standards defined by the INCITS (Inter National Committee for Information Technology Standards) T10.

Steps S601, S603, S605, and S607 indicate procedures performed by the system controller. Steps S602, S604, S606, and S608 indicate procedures of the drive apparatus.

In step S601, the type of a medium loaded into the drive apparatus is requested from the system controller and the system controller recognizes the media is the write-once pseudo-overwritable disc and recognizes that the drive apparatus supports the pseudo-overwrite function.

In step S602, the drive apparatus reads out information of the type of the loaded disc. The drive apparatus also determines whether or not the pseudo-overwrite function is supported with respect to the disc. The drive apparatus informs the system controller of these pieces of information.

In step S603, by requesting the track information of a write-once disc, the system controller obtains the information from the drive apparatus. Specifically, the size of an unrecorded area in Track #2, and the next writable address in the track or the last recorded address in the track are requested. In order to write the data of the file, it is necessary to get the above-described information in advance, and it is checked whether or not the unrecorded area has a prescribed size or more. Since in Track #2 additional Metadata file may be allocated, for example, the prescribed size may be 128 MB for the disc of a whole capacity with 23 GB. If the size of the unrecorded area is less than the prescribed size, the disc is used as a read-only disc. If the size is equal to or greater than a prescribed size, the procedure goes to the next step. The size of a file entry is 2 KB. When only file entries are recorded in an available area of 128 MB, file entries corresponding to 65,536 files at most can be recorded.

In step S604, the drive apparatus reads the information related with the number of tracks, the positional information and the open/close state of each track, or the last recorded address information, from the lead-in area, DMA, or TDMA of the loaded disc. The system controller is informed of these pieces of information.

In step S605, the drive apparatus is instructed to read the Metadata Bitmap area. As a result, the system controller obtains the Metadata Bitmap, and it is checked whether or not there are available sectors. When there are available sectors, the procedure goes to the next step. When there are no available sectors, an additional area for a Metadata file is assigned in the unrecorded area of Track #2 to reserve the available sectors. In this checking, the system controller may determine whether the additional area for a Metadata file is reserved or not, by using the prescribed size for the available sectors, for example, the prescribed size may be 128 KB.

In step S606, the drive apparatus reads data from the specified area, and transfers the data to the system controller.

In step S607, by requesting spare area information to the drive apparatus, the system controller obtains the information and checks whether or not there is an unrecorded area in the spare area having a prescribed size or more.

For example, when the size of the unrecorded area is equal to or greater than 8 MB, the disc is usable as a recordable disc. When the size is less than 8 MB, the disc is used as a read-only disc. The spare area is used not only for pseudo-overwrite, but also for defect management. Therefore, an additional unrecorded area is needed to recover defective sectors on the disc.

In step S608, the drive apparatus reads the number of spare areas, the size of spare areas, and the size of an unrecorded area in each spare area, from the lead-in area, DMA, or TDMA of the loaded disc. The system controller is informed of these pieces of information.

As described above, the data is recorded in the unrecorded area in the spare area by pseudo-overwrite or defect management. The write-once disc drive apparatus of the present invention has a function to send the free area information as well as the type information of a medium to a system controller, because the drive apparatus stores the data at some location which may be different from the location the file system expects. By requesting this free area information whenever a file is recorded, the system controller decides whether the file can be recorded or not, as a result, the system controller can record a file correctly with the related data in the Metadata file.

Embodiment 3

In the previous embodiment 2, the spare area with sufficient size has to be assigned at the time of formatting on a write-once disc. However, a user cannot know how many files and the size of the files that will be recorded on the disc, therefore, it is difficult to decide the appropriate size of the spare area at the time of formatting. If all of the spare area is used, no file can be recorded on the disc, even if the unrecorded area remains in the user data area. On the other hand, if a larger spare area is assigned, after all of the user data area is used, unrecorded area may remain in the spare area.

Further, a file system driver has to check the size of the unrecorded area in the spare area each time when a file is recorded, hence the space management becomes difficult to implement. This is not suitable for the implementation of file system driver of computer systems.

So, hereinafter a recording method in which the direction to replace the data not only within the spare area but also within the user data area is explained.

At first, an idea of the present invention is described:

Devices handle the overwriting of existing data by writing the new data to the next writable block and creating an entry in a remapping table stored by the drive apparatus. The file system continues to use the same logical block number, and the drive apparatus remaps the request to the new location based on the entry in the table. In order to reduce the size of this table, the file system does not reuse blocks after they are freed. That is, the file system has to be aware that it is using write-once media, and adjust its behavior accordingly.

The device uses the normal volume space to store the remapped data. That is, it is writing to the next writable location within the same track that the original block exists. The file system queries the device for the next writable block whenever it needs to allocate new space. So both the file system and the device are sharing the same space for writes.

Secondly, the effectiveness of the above idea is described using FIGS. 7A-7D, 8A-8B and 9:

FIGS. 7A-7D and 8A-8B show the blocks in a user data area. Herein, the block is used rather than the sector to explain the idea generally. The user data area is recognized as a volume space by the file system. For each block, a Physical Block Address (hereafter described as PBA) and a Logical Block Address (hereafter described as LBA) are assigned so that the correspondence between PBA and LBA are decided in advance, wherein as an example, PBA is assigned from the number 100 and LBA is assigned from the number 0.

Figure 9:
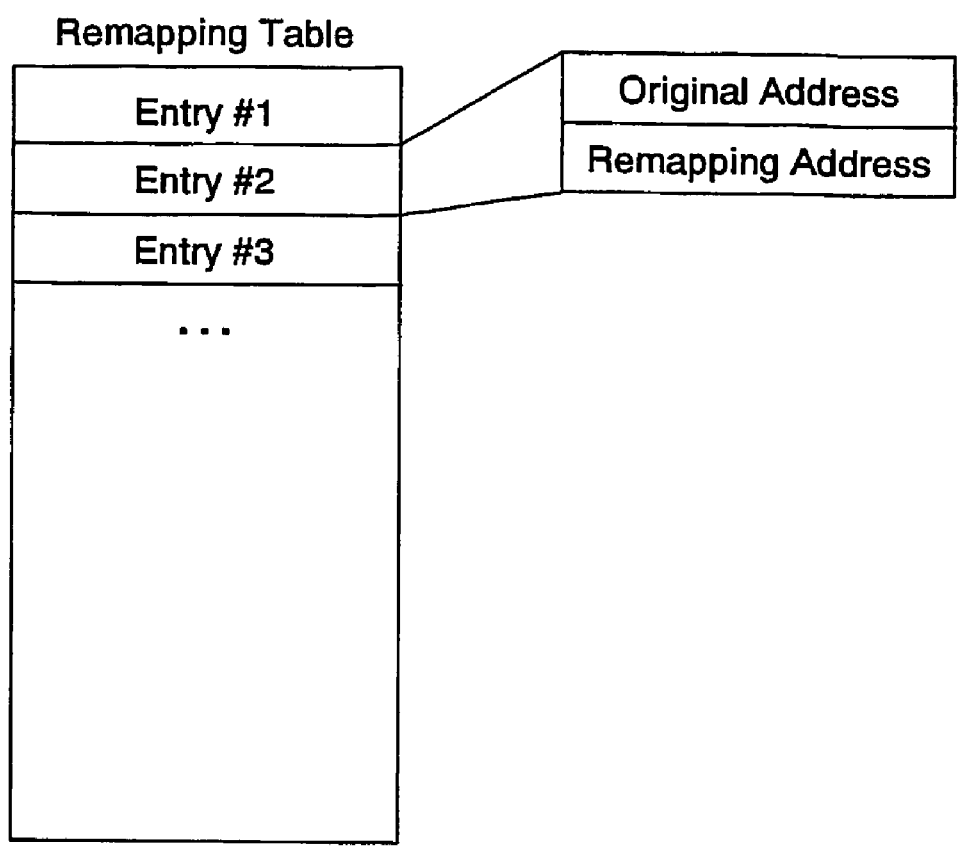
FIG. 9 is a diagram illustrating the data structure of the remapping table.

FIG. 9 shows the data structure of the remapping table stored by the drive apparatus. The table has entries, each of which specify the original address and remapping address. This data structure may be the common data structure with the defect list which is used for defect management for rewritable discs.

Typically, it had seemed that the above idea was not effective, because there are contradictions when applied for rewritable discs.

Figure 7A:
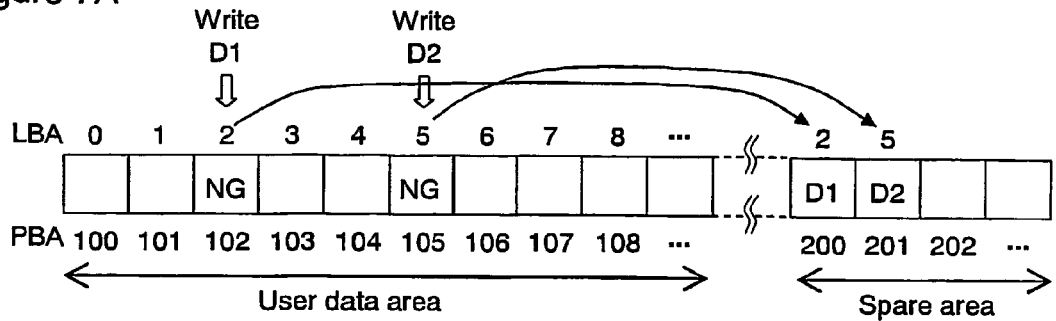
FIGS. 7A-7D each comprise a diagram illustrating the blocks in a user data area, when the data is remapped for a rewritable disc case and write-once disc case.

As shown in FIG. 7A, a rewritable disc has a spare area, in which a PBA is assigned from the number 200, for example. In a usual case for a rewritable disc, if the data are written to the blocks of LBA 2 and 5 and these blocks are defective, these data are stored into the blocks PBA 200 and 201 in the spare area using a linear replacement algorithm. This means LBA 2 and 5 is re-assigned to PBA 200 and 201. Thus, when some block in the volume space becomes an unusable block due to defect, it is compensated with a good block in the spare area.

Figure 7B:
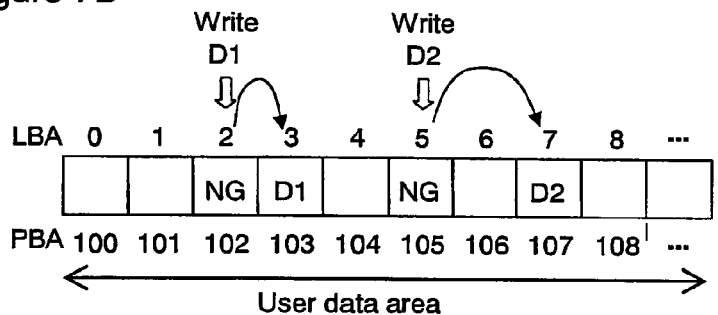

If the above idea would be applied to a rewritable disc, as shown in FIG. 7B, the data to write LBA 2 and 5 are stored into the blocks in a user data area, for example, PBA 103 and 107. However, these remapped blocks of PBA 103 and 107 cannot be used to store the data requested to LBA 3 and 7, as these blocks are replaced as LBA 2 and 5. This situation breaks the assumption to provide a defect free logical space, in which the assumption that the data capacity on the rewritable disc shall not be reduced, when any data is recorded by the file system. Further, in this situation, the drive apparatus could not decide the location to remap the data, because the file system may write the data randomly and only the file system handles the space bitmap which specifies the available area for recording.

Figure 7C:
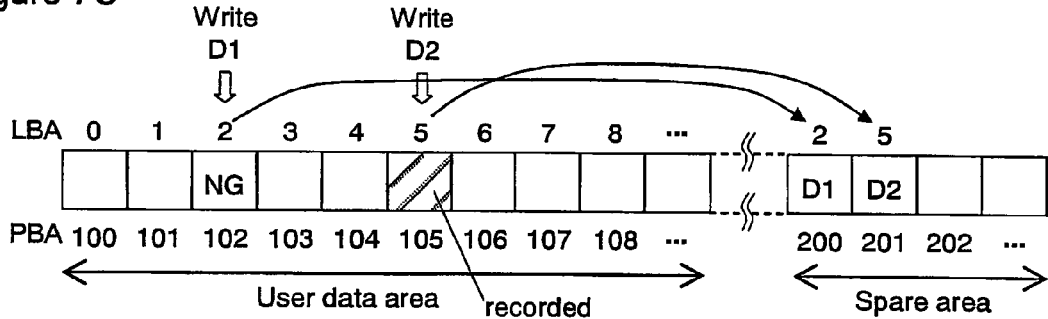

As explained in embodiment 1, the linear replacement algorithm can also be applied to write-once discs. As shown in FIG. 7C, the spare area is assigned for the write-once disc in advance. If the block is overwritten or can not be written due to a defect, the block is compensated with the block in the spare area. As examples, when the data D1 is written to LBA 2, if the block is defective, the block is compensated with the block of PBA 200. When LBA 5 is written by the data D2, even if the PBA 105 is already recorded, the data is stored into PBA 201.

It is supposed that a block to be overwritten and a defective block should be compensated with another block which belongs to outside of the volume space. This idea seems to be a contradiction not only for rewritable discs, but also for write-once discs.

Figure 7D:
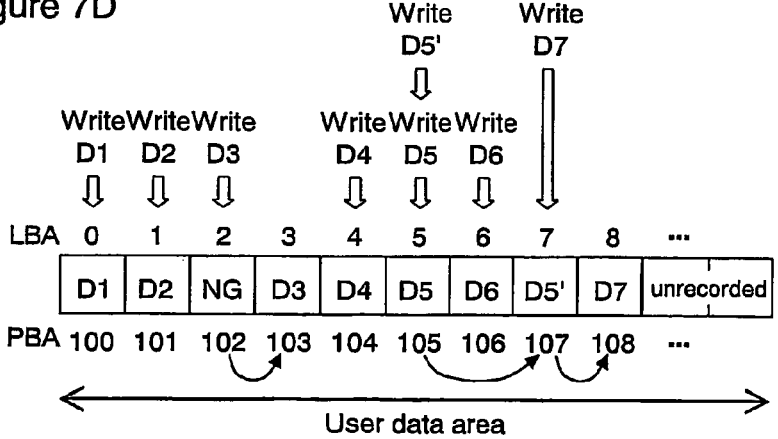

However, according to the present invention, write-once discs may not guarantee to provide defect free logical space like rewritable discs, because if a block on a write-once disc is written once, it is not possible to change the data in the block. And the new file system for write-once discs would write the data using sequential recording. On this point, this idea is effective for a write-once disc as shown in FIG. 7D. The data D1, D2 and D3 are written to LBA 0, 1 and 2, sequentially, at this time if the block PBA 102 is defective, then the data may be written to the next block PBA 103. Further, the data D4, D5 and D6 are written to LBA 4, 5 and 6, sequentially, and then the updated data D5' may be overwritten to LBA 5. On this overwrite, the data is stored into the block PBA 107 which is the next writable location. Thus, this idea does not require changing the assignment of a logical block number, because whenever the overwritten is needed, the data can be written to next writable location until the user data area is used up. In case of a rewritable disc, the data can not be recorded into the block used for remapping, but there is no problem for the present invention of a write-once disc. For example, the data may be recorded further into the block of LBA 7. In this case, the data is stored in PBA 108 and the entry to specify this remapping from the original address of PBA 107 to the remapping address of PBA 108 is added in the remapping table.

As explained above, according to the present invention, even if the Logical Block Address is double booking, the drive apparatus can record the data by assigning a new Physical Block Address to NWA.

Figure 8A:
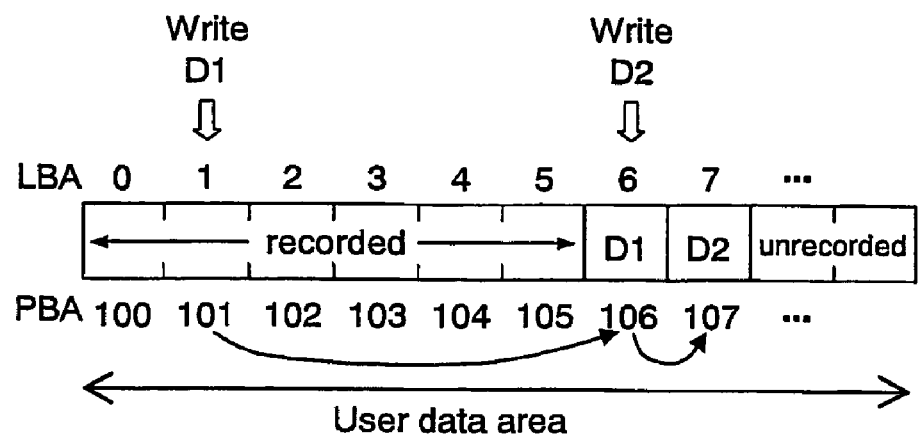
FIGS. 8A and 8B each comprise a diagram illustrating the blocks in a user data area, when the data is written to NWA.
Figure 8B:
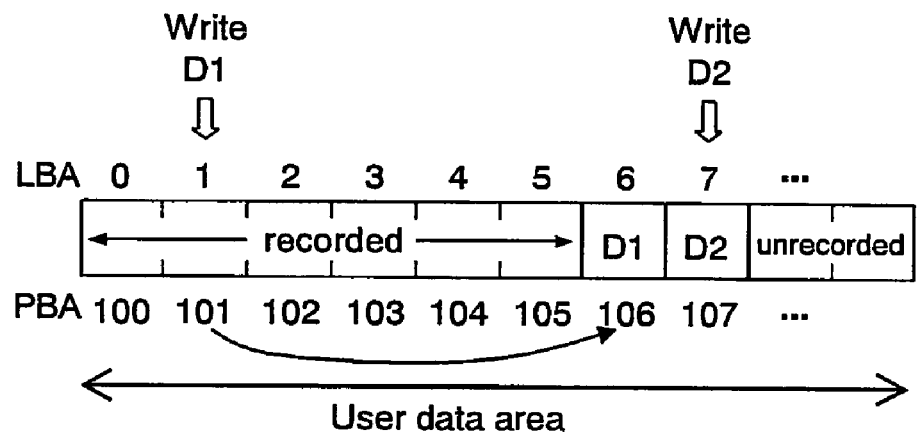

Another important point to be practical to the above idea is to save the entries stored in the remapping table by querying the next writable address from the file system to the drive apparatus. FIGS. 8A and 8B show the mechanism to reduce the size of the table. In this figure, blocks PBA 100 to 105 are recorded in advance. As shown in FIG. 8A, when the data D1 is written to LBA 1, the data is stored in next writable location PBA 106 and one entry is added to specify PBA 101 is remapped to PBA 106. At this moment, the file system does not know where the data is remapped. If file system instructs to write the new data D2 to the previous next writable location LBA 6, the data is stored to the next block PBA 107 and one entry is added. In the present invention, the file system checks the updated next writable address before any data is recorded barring overwrite, and instruct to write the data at the updated next writable address, of which is LBA 7 in FIG. 8B. Thus, an additional entry is not needed. The file system will not also reallocate the data to the deleted file area, barring the requirement to overwrite for the same reason.

Thirdly, it is described that the above mentioned idea is commonly applicable for defect management, logical overwrite and storing a list related to defect remapping. In this embodiment, the list, in which the remapping information due to the defect management and the logical overwrite is stored, is called the "defect/remap list." In the case of conventional write-once media such as CD-R, DVD-R and DVD+R, there is no area to store the defect/remap list and no spare area. However, the present invention can apply to these media, as the defect/remap list can be written within the volume space, and the data to be replaced due to a defective sector can be remapped within the volume space. This provides benefits for users, as the user may not be aware of the defects on the disc, and further, the user can use a drag-and-drop technique or the like to copy files on the disc, like an overwritable disc.

Figure 10:
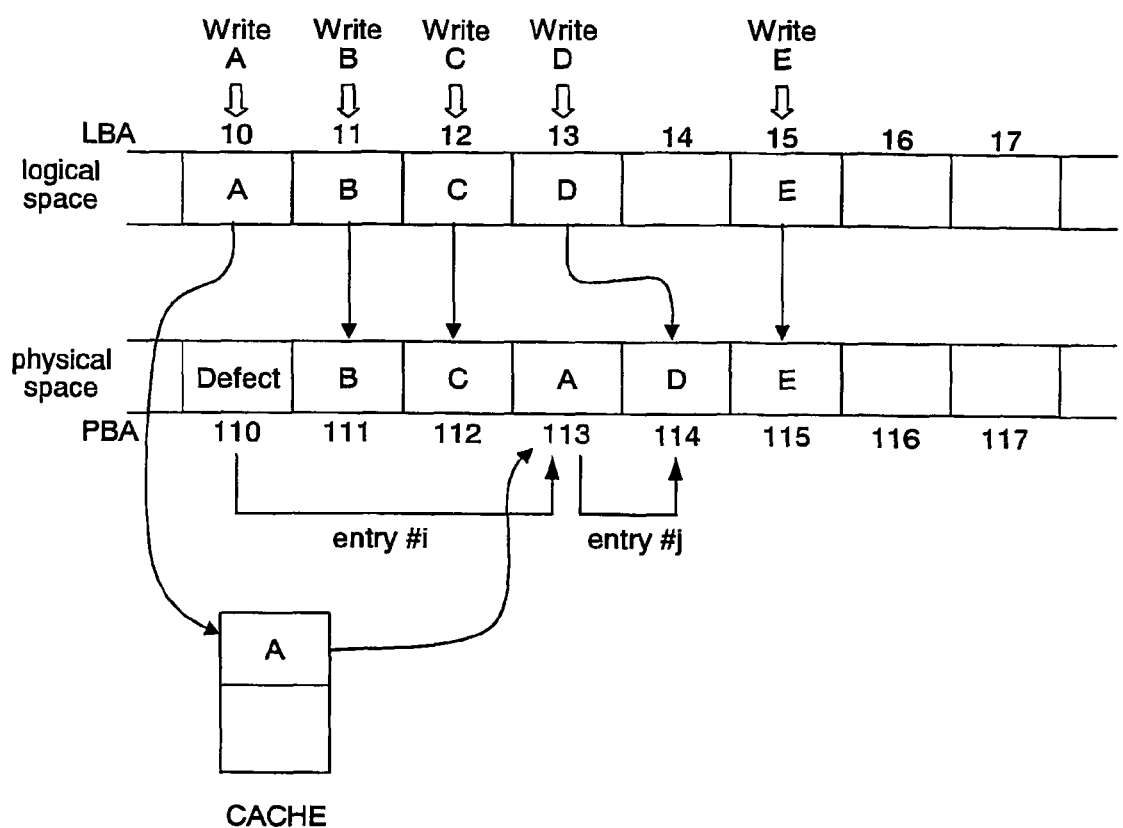
FIG. 10 is a diagram illustrating the blocks in a user data area, showing a mechanism to save the entry in a defect/remap list, when data is written into a defective block.
Figure 11:
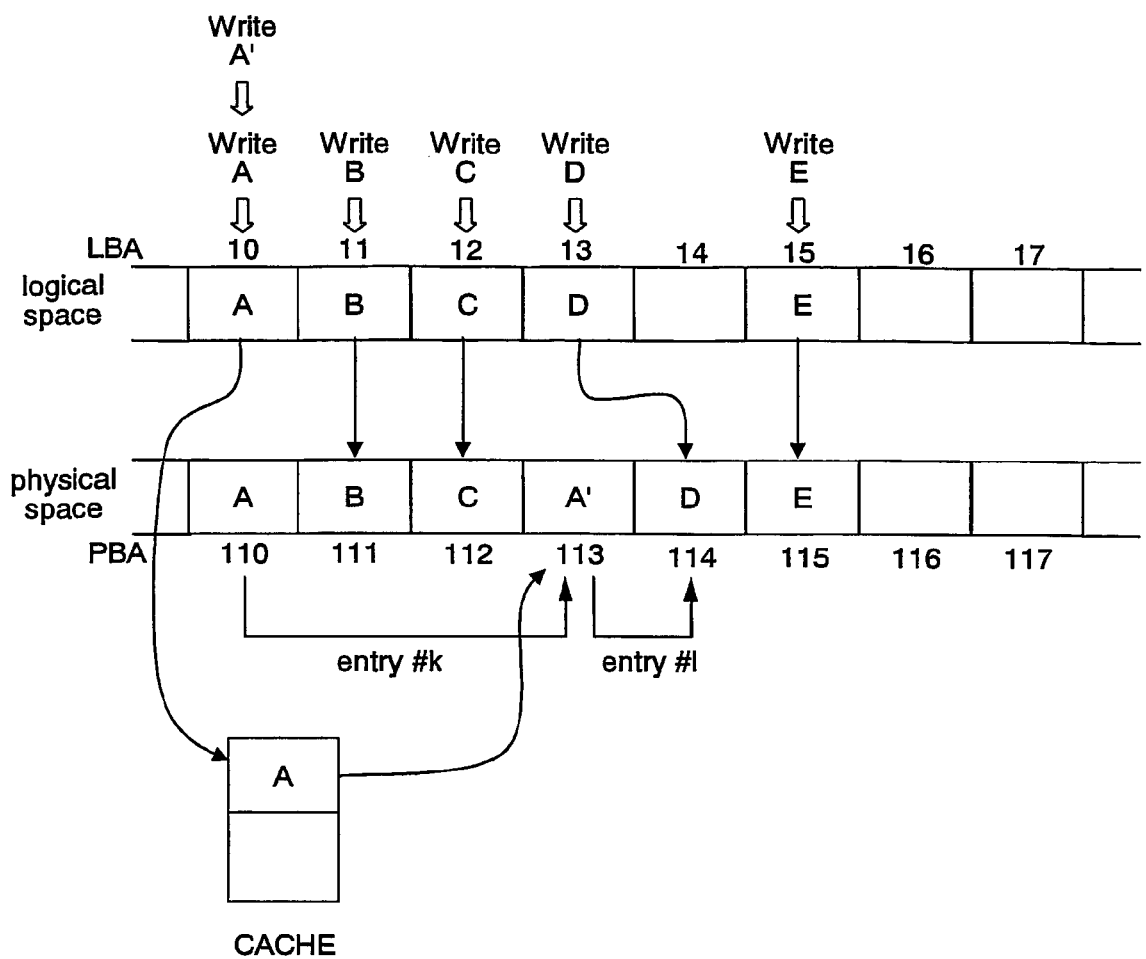
FIG. 11 is a diagram illustrating the blocks in a user data area, showing the mechanism to save the entry in the defect/remap list, when the data is logically overwritten into the logical block.
Figure 12:
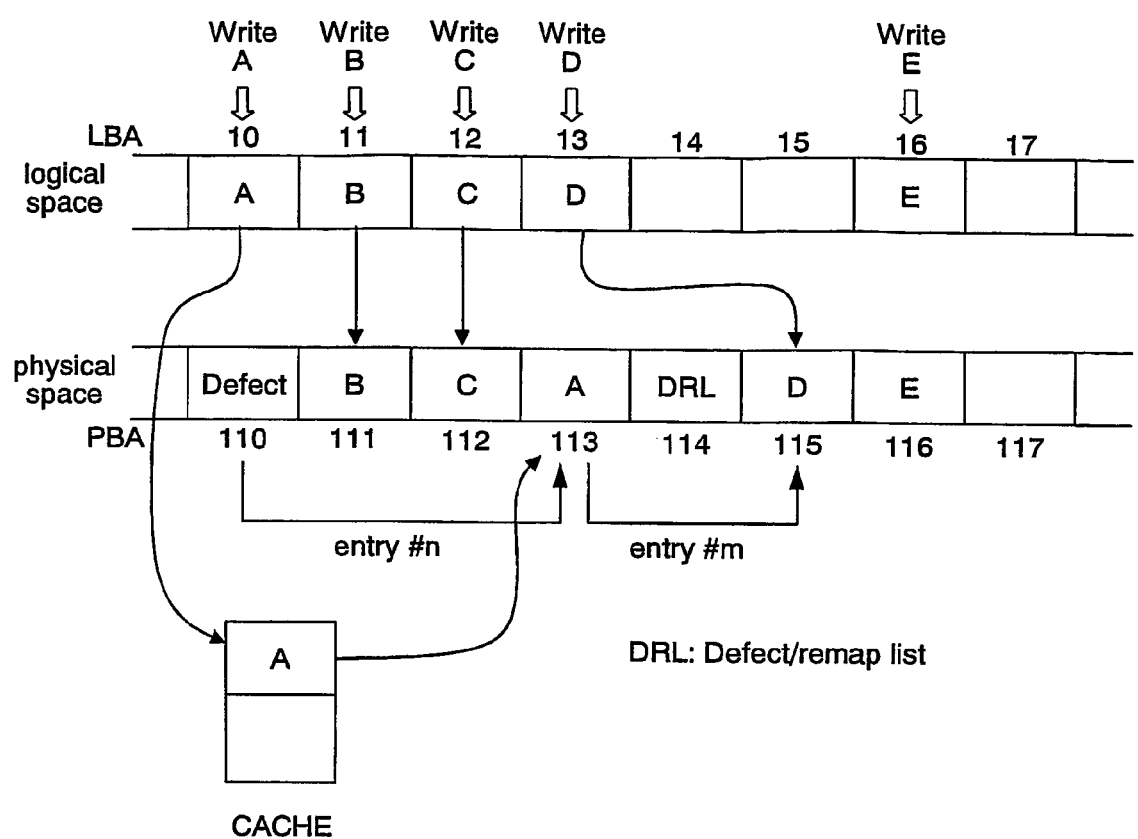
FIG. 12 is a diagram illustrating the blocks in a user data area, showing the mechanism to save the entry in the defect/remap list, when the defect/remap list is written in the volume space.

FIGS. 10, 11 and 12 show a part of the area in a user data area. In the volume space as a logical space, each logical block has a Logical Block Address (LBA). Corresponding to the logical space, in the user data area as a physical space, each physical block has a Physical Block Address (PBA). In this example, LBA 0 corresponds to PBA 100. The data can be cached temporary in a memory in the drive apparatus, before the data is written into the physical block. Before the write instructions shown in these figures are issued, the NWA is PBA 110.

FIG. 10 shows a mechanism to save the entry in the defect/remap list, when the data is written into the defective block. The file system instructs the drive apparatus to write the data A, B and C into LBA 10, 11 and 12, respectively. In this example, the block of PBA 110 is a defective block. The defective block is found during the verification operation, in which the data is read out after being written. The data A to be written into LBA 10 is stored in the cache until the other data is verified. After that, the data A is written into the NWA at PBA 113 and the entry to indicate the remapping information from PBA 110 to PBA 113 is created. Thus, the drive apparatus can save the additional entry by using the cache. If the data A is not cached, the data A, B and C are written into PBA 111, 112 and 113 by the pseudo-overwrite operation. Even if the data D is instructed to write into LBA 13, the data can be written logically to the logical block, as the data can be written to the next block and remapped by creating the entry which indicates PBA 113 is remapped to PBA 114. If the drive apparatus is instructed to write data E into the NWA at LBA 15, the data E is written to the corresponding physical block at PBA 115 without creating an additional entry in the defect/remap list.

FIG. 11 shows the mechanism to save the entry in the defect/remap list, when the data is logically overwritten into the logical block. At first, the file system instructs the drive apparatus to write the data A into LBA 10, and then instructs the drive apparatus to write the data A', B and C into LBA 10, 11 and 12, respectively. The data A' to be written into LBA 10 is stored in the cache until the other data is written and verified. After that, the data A' is written into the NWA at PBA 113, and the entry to indicate the remapping information from PBA 110 to PBA 113 is created. The file system may instruct the drive apparatus to write data D into LBA 13, and the data can be written to PBA 114 by using the pseudo-overwrite operation. If the drive apparatus is instructed to write data E to the NWA at LBA 15, the data is written to the corresponding physical block at PBA 115.

FIG. 12 shows the mechanism to save the entry in the defect/remap list, when the defect/remap list is written into the physical block corresponding to the logical block in the volume space. The file system instructs to write the data A, B and C into LBA 10, 11 and 12, respectively. In this example, the block at PBA 110 is a defective block and is found during the verification. The data A to be written into LBA 10 is stored in the cache until the other data is written with the verification. After that, the data A is written into the NWA at PBA 113 and the defect/remap list, which has the entry to indicate the remapping information from PBA 110 to PBA 113, is written into the NWA at PBA 114. Thus, the drive apparatus can write the defect/remap list in the volume space. Even if the file system instructs that data D is to be written into LBA 13, the data can be written logically to the logical block by the pseudo-overwrite operation, as the data is written at PBA 115. If the file system instructs that data E is to be written into the NWA, the data is written without any additional entry.

Furthermore, the space management by the file system can be simplified, because the file system uses only NWA in each track to allocate the new area for recording. This means the file system may not be checked in the spare area, and may not record the space bitmap, especially the Metadata Bitmap.

The unit to remap the area may be an ECC block which comprises a plurality of physical sectors. When a physical sector is remapped, all of the physical sectors in the ECC block in which the physical sector belongs to are remapped.

In this case, the original address and remapping address in the entry of the defect/remap list are specified by the physical address of the start sector of each ECC block. As an addressable unit, the physical block and the logical block may be the physical sector and the logical sector. Even if one sector is newly written, one ECC block including the sector is written, then the NWA is moved to the start sector of the next ECC block. Therefore, when several data are written, these data are allocated so that these data are written with the same ECC block.

By the present invention, the merits to use the Metadata Partition can be provided for the use on the write-once disc. At first, the data to be overwritten is remapped within the track for metadata writing, then the access to retrieve the metadata can be localized and the performance is improved. As usual, the overwritten data is stored in the same track as long as the track has unrecorded sectors. When the track is used up by data recording, the overwritten data may be stored into the other track, as it is given the priority to write the data to the other unrecorded physical block in the same track. Secondly, Metadata Mirror File can be recorded to improve the robustness, when an additional track for a Metadata Mirror File is assigned.

Herein, the potential for overwriting is estimated for the example case that the capacity of the disc is 15 GB (=15× 1024^3 bytes), the ECC block consists of 32 sectors, and the sector size is 2 KB (=2×1024 bytes). If the average size of the files recorded on the disc is 128 KB and 10 files are stored in the directory on average, about 123,000 files and 12,000 directories can be recorded on the disc. When the file system clusters the file entries to be updated into an ECC block, about 4,200 entries are needed in the remapping table. The size of the defect/remap list becomes about 32 KB when the size of the entry is 8 bytes. When the drive apparatus can handle 256 KB of the defect/remap list as the maximum size, 123,000 files and 12,000 directories is written randomly. Thus, this invention is also practical for the next generation write-once optical discs using blue laser technology.

For 4.3 GB DVD discs, about 35,000 files and 3,500 directories can be recorded, when the file size is 128 KB and 10 files per directory are recorded. In such a case, the size of the defect/remap list becomes about 19 KB, if each 16 file entries are clustered into an ECC block. Then, the drive apparatus can handle 64 KB of the defect/remap list as the maximum size, 35,000 files and 3,500 directories is written randomly.

An example applying the above idea to a new file system based on UDF and the next generation write-once disc, even if the disc has no spare area in the Lead-in area and the Lead-out area is described. The present invention can be applied for not only HD DVD-R discs, but also DVD-R discs and DVD+R disc.

Figure 13:
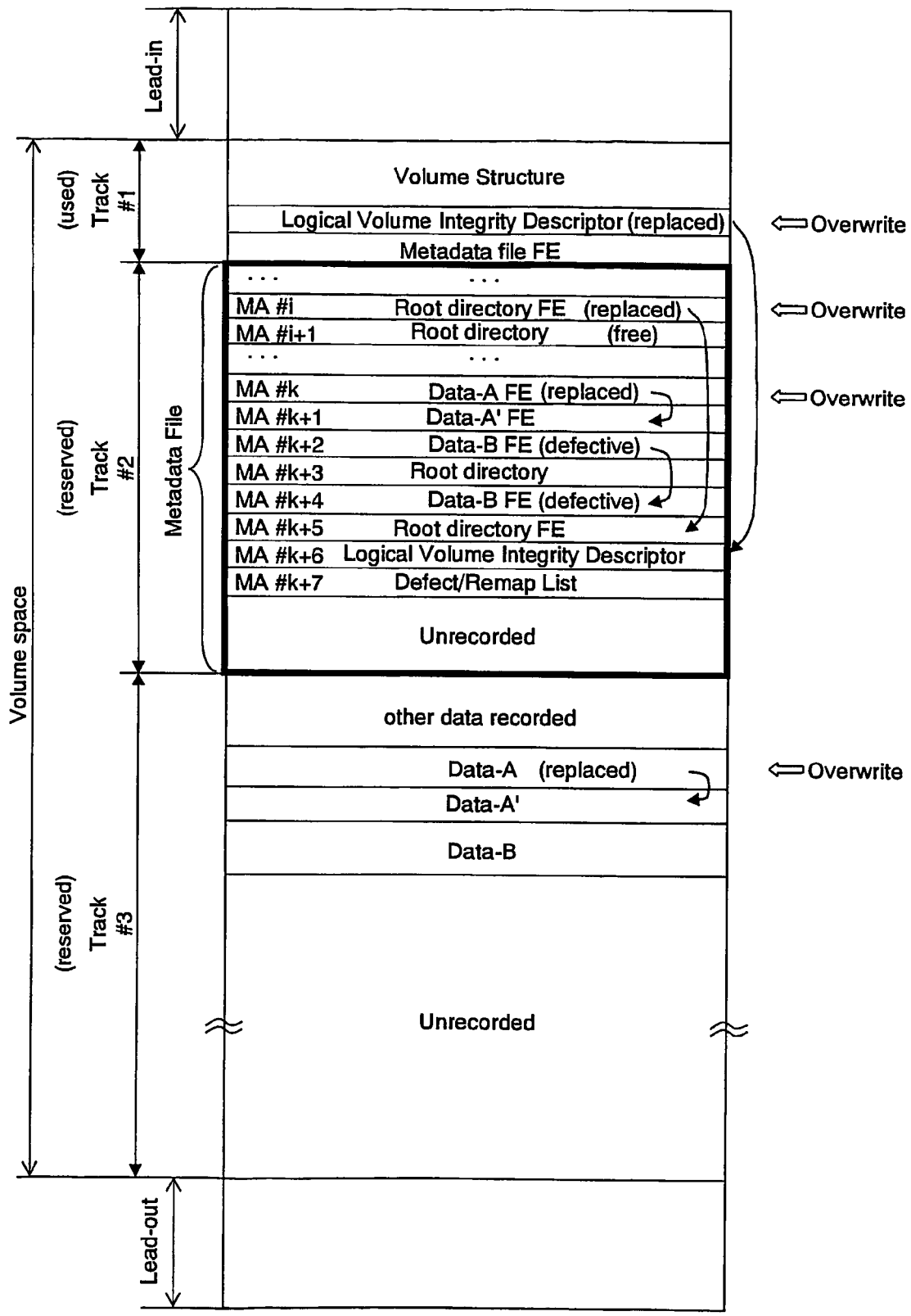
FIG. 13 is a diagram illustrating a configuration of areas to explain a pseudo-overwrite method.

FIG. 13 is a diagram illustrating a configuration of areas to explain the above mentioned remapping. In this example, there is no Defect Management Area (DMA) and no Temporary DMA (TDMA). It will help to simplify the implementation of the drive apparatus, because the interpretation of the entry is common for defect management and for pseudo-overwrite. When the entry specifies the remapping information, the entry in the defect/remap list indicates the correspondence between the address of a block to be remapped and the address of a remapped block.

The volume space comprises three tracks, in each of which the data is recorded sequentially. The start address of the unrecorded area in the track is managed as Next Writable Address (NWA). The status of a track is described by new terms: "Used" and "Reserved" in order to indicate the data in these tracks can be overwritten and the data may be remapped within the reserved track. The used track means that all sectors in a track have been used for data recording. The reserved track means that there is a sector(s), which has not been recorded. In other words, the data can be incrementally written into the reserved track. Since the volume structure has been previously recorded, Tracks #1 is a used track. Track #2 is a reserved track assigned for metadata recording. Track #3 is a reserved track assigned for user data recording.

An exemplary procedure for updating Data-A file and recording Data-B file onto the write-once optical disc is described.

At first, the Metadata file FE is read to obtain the area allocated for the Metadata file, wherein MA (Metadata file Address) indicates a relative address within a Metadata file.

When the file system updates the Data-A file, the file entry is read in the memory and the file entry is updated in order to register the information to specify the location where the updated data will be written and the related information (e.g., size and updated time, etc) in the memory. The file system instructs the drive apparatus to overwrite the data of Data-A file logically. Then the drive apparatus stores the data (Data-A') physically to the NWA, as the corresponding physical sector is already recorded and the drive apparatus adds the entry to the defect/remap list. If the file system instructs to write the data to NWA after querying the drive apparatus, it is not required to add the entry in the defect list. In this invention, this manner to save the entry is recommended, because the location of the data can be registered in the file entry. However, when a part of the large file has to be updated, the data to be updated may be overwritten instead of writing the whole data of the file. After the data is written on the disc, the file system instructs to overwrite the file entry (Data-A' FE) logically in order to specify the location of the written data and the updated time. Then the drive apparatus writes the data physically into the sector shown at MA #k+1 and stores the entry into the defect/remap list.

When the file system newly records the Data-B file under the root directory, the directory is read into the memory and the directory is updated to add the new file (Data-B file) to this directory in the memory. Beforehand the file entry of the Data-B file is created in the memory, the data of Data-B file is written at the NWA in Track #3, and then the file entry (Data-B FE) and the root directory in the memory are written from the NWA shown as MA #k+2 in Track #2. Whenever the data is written, the drive apparatus reads out the written data and checks whether the data is written correctly. In this example, it is found that the sector at MA #k+2 is a defective sector. Then, the data of Data-B FE is written to the NWA at MA #k+4 and the entry to indicate this remapping is added into the defect/remap/list in the memory. To specify the new location of the root directory, the updated file entry for the directory is instructed to overwrite into MA #i and the data is written at the NWA shown as MA #k+5. Thus, only the file entry of the directory among metadata is overwritten to save the entry, and the other metadata (the file entry of the file and the directory) and the data of the file are written without overwriting.

To indicate the integrity of the file structure, the updated Logical Volume Integrity Descriptor is instructed to overwrite, and the data is written at the sector MA #k+6 in Track #2.

At last, the defect/remap list is written at the NWA at MA #k+7. The drive apparatus writes the defect/remap list, when the disc is ejected or when the pre-determined time passed after some write commands are executed.

In the above pseudo-overwrite operation, the data to be overwritten is stored into the NWA in the reserved track in response to an instruction to write the data into an already recorded area. Similarly, the data to be replaced by the defect management is also stored into the NWA in the reserved track.

Figure 14A:
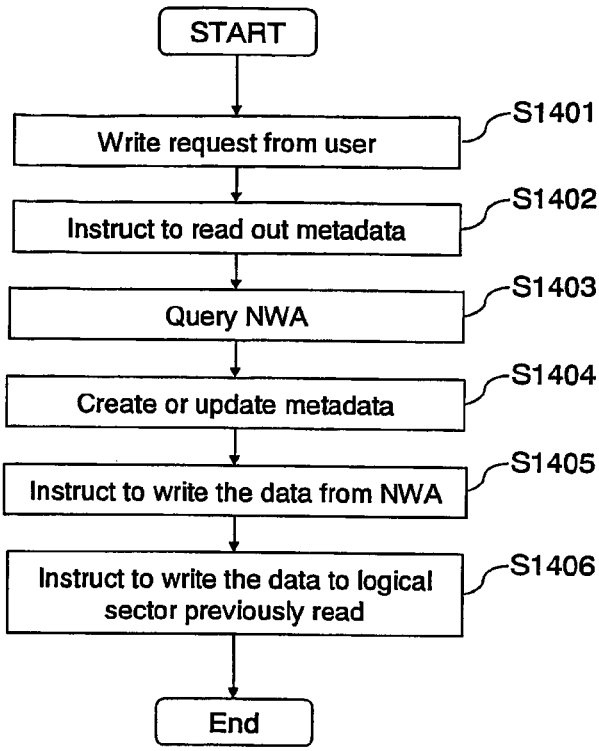
FIGS. 14A and 14B each comprise a flowchart illustrating a procedure to write the data by an optical disc information recording/reproduction system.
Figure 14B:
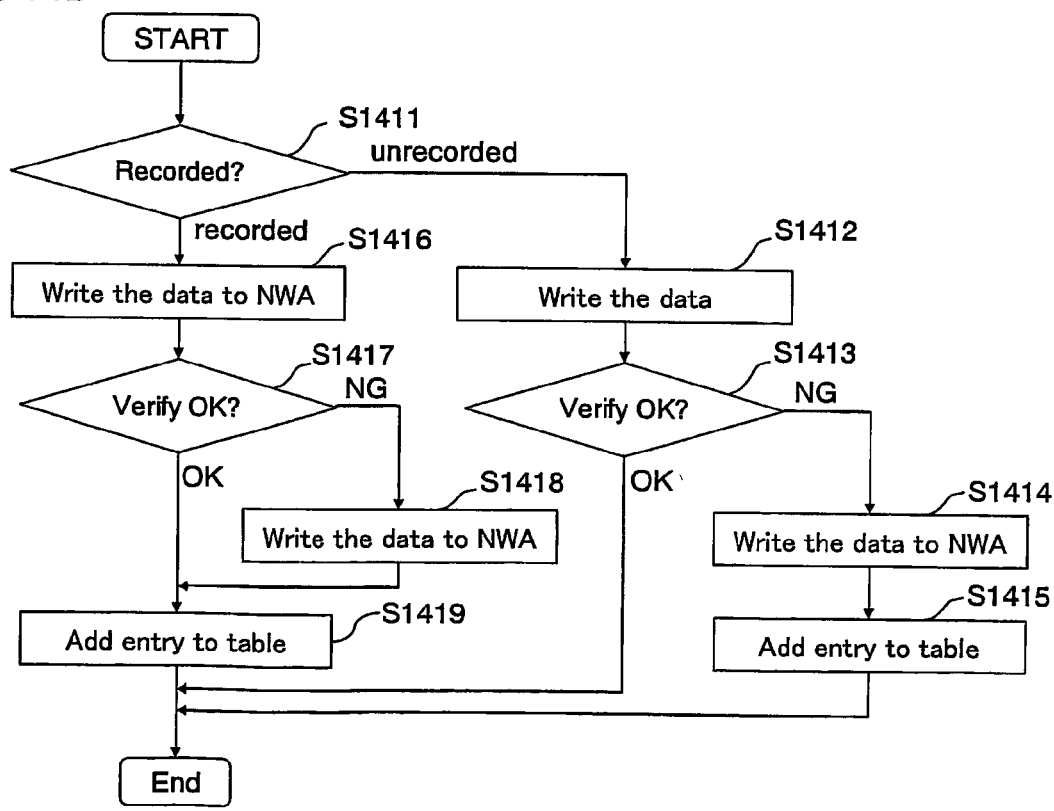

FIGS. 14A and 14B are flowcharts illustrating a procedure to write the data on a write-once optical disc. Hereinafter, the procedure to write the data by the optical disc information recording/reproduction system described in FIG. 5 is explained.

When the file is updated, the file system will instruct to write the data of the file so that the data is written without overwriting, and the file system will create the file entry by updating the written file entry and will instruct to write the file entry so that the file entry is overwritten.

When a new file is recorded under the directory, the file system creates the file entry of the file and creates the directory and the file entry of the directory by updating the written directory and it's file entry in the memory and instructs to write the data of the file, the file entry and the directory so that these data are written without overwriting. Then the file system will instruct to write the file entry of the directory so that the file entry is overwritten.

FIG. 14A is the procedure by the file system performed in controller 511. FIG. 14B is the procedure by the drive apparatus 520.

In step S1401, the system controller 510 receives the request from the user. For example, the request is to replace Data-A file as new data or to copy Data-B file from the other media to under the root directory on this disc. The data to be written is transferred to the memory 512 in the system controller 510 and the destination to record the data is indicated by the pathname in the directory tree structure.

In step S1402, the file system instructs the drive apparatus to read the data to retrieve the directory or file which is requested by user. The metadata such as file entry and directory are read from Metadata File.

In step S1403, the file system queries NWA before it instructs the drive apparatus to write the data, because there is a possibility that the drive apparatus will move the NWA.

In step S1404, in response to the user requests, the file system creates the some of metadata so that the data amount to be overwritten is minimized by distinguishing the type of the data to be written. As described in the explanation for FIG. 13, in the case of a file being updated, the file system creates the file entry to specify the location of the data to be written. This file entry is the data to be overwritten. In the case of a new file being recorded under the directory, the file system creates the file entry of the new file and updates the directory to register the new file and the file entry of the directory. The file entry of the directory is the data to be overwritten and the other metadata is the data which can be written without being overwritten.

In step S1405, the file system instructs the drive apparatus to write the data which is not needed to be overwritten from NWA.

In step S1406, the file system instructs the drive apparatus to write the data so that the data is overwritten on the logical sector. In step S1405 and S1406, the same write command can be used to instruct to write the data, because the drive apparatus can judge whether the data should be written with overwrite or without by checking the status of the logical sector in step S1411.

In step S1411, the drive apparatus 520 receives the write command, which specifies at least a logical sector in which the data is to be written, from the controller 511 and checks whether the logical sector specified by the write command corresponds to a recorded physical sector or an unrecorded physical sector. In this check, the drive apparatus 520 judges the state of the physical sector using the logical sector number which is instructed to write by the controller 511. When the logical sector number is smaller than the NWA, the physical sector is recorded, otherwise the physical sector is unrecorded. If the physical sector is unrecorded, the process proceeds to step S1412, other wise the process proceeds to step S1416.

In step S1412, the drive apparatus 520 writes the data to the unrecorded physical sector which corresponds to the logical sector in advance.

In step S1413, the drive apparatus 520 reads out the data written in the previous step and checks whether the data was written correctly as a verification step. If the data was not written correctly, the procedure proceeds to step S1414, otherwise the procedure is ended.

In step S1414, the drive apparatus 520 writes the data into the NWA, which is not the unrecorded physical sector which the verification of the written data is not successful. The unrecorded physical sector is selected from the plurality of physical sectors corresponding to the plurality of logical sectors in the volume space.

In step S1415, the drive apparatus 520 creates the remapping table including remapping information which remaps an original address of the physical sector corresponding to the logical sector specified by the write command to a remapping address of the selected physical sector, and stores the remapping information to the defect list/remapping table on the write once disc. Later, the drive apparatus will write the defect/remap list to the NWA.

In step S1416, the drive apparatus 520 writes the data into an unrecorded physical sector other than the recorded physical sector. The unrecorded physical sector is selected from the plurality of physical sectors corresponding to the plurality of logical sectors in the volume space. When the data is remapped on an ECC block basis, the other unrecorded physical sector is one of the sectors belonging to the ECC block which is the next writable block. For example, in case the ECC block consists of 32 sectors, the second sector in the ECC block is instructed to be overwritten, the data is physically written into the second sector in the next writable ECC block. Thus the relative address within the ECC block is kept for the remapped ECC block.

In step S1417, the drive apparatus 520 reads out the data written in the previous step and checks whether the data was written correctly as a verification step. If the data was not written correctly, the procedure proceeds to step S1418, otherwise the procedure proceeds to step S1419.

In step S1418, the drive apparatus 520 writes the data into an unrecorded physical sector other that the unrecorded physical sector in which the verification of the written data is not successful. The unrecorded physical sector selected from the plurality of physical sectors corresponding to the plurality of logical sectors in the volume space.

In step S1419, the drive apparatus 520 creates the remapping table including remapping information which remaps an original address of the physical sector corresponding to the logical sector specified by the write instruction to a remapping address of the selected physical sector, and stores the remapping information to the defect list/remapping table on the write-once disc. In the case the ECC block consists of 32 sectors, the original address is the start address of the ECC block to which the original physical sector belongs and the remapped address is the start address of the ECC block to which the remapped physical sector belongs. Later, the drive apparatus will write the defect/remap list to the NWA.

Figure 15:
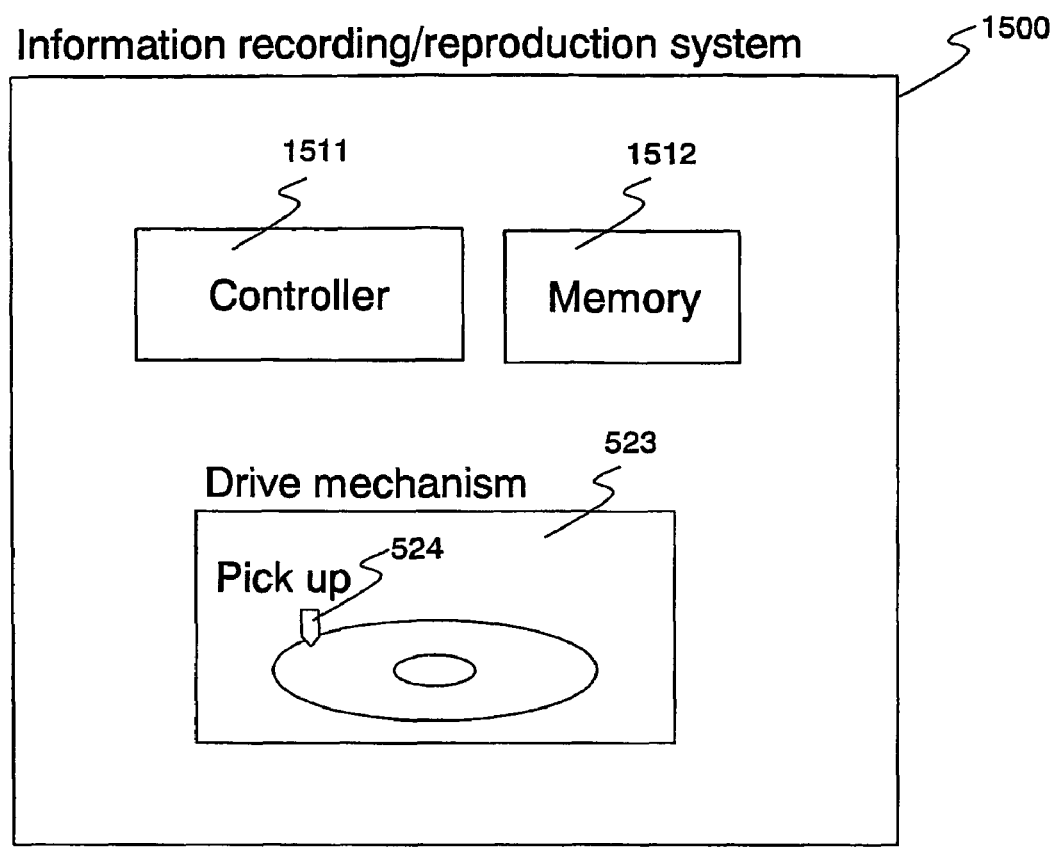
FIG. 15 is a diagram illustrating an optical disc information recording/reproduction system that is a part of a consumer video recorder or consumer video player.

When this invention is applied to the recording/reproduction system such as a consumer video recorder or a consumer video player, the controller 511 and the drive apparatus 520 may be controlled by the common micro processor as shown in FIG. 15. In this case, the controller 511 may not query the NWA to the drive apparatus, because the recording/reproduction system knows the NWA. At first, the NWA in each track is checked when the disc is loaded in the drive unit, then this system can manage the NWA after some data is written.

FIG. 15 shows an optical disc information recording/reproduction system 1500 which is a part of a consumer video recorder or a consumer video player. The information recording/reproduction system 1500 includes a controller 1511, a memory 1212 and a drive mechanism 523 for reading and writing information from and onto an optical disc. The controller 1511 may be, for example, a semiconductor integrated circuit such as a CPU (Central Processing Unit) and performs the method described in the embodiments of the present inventions. Further, a program for causing the controller 1511 to perform the method described in the embodiments is stored in the memory 1512. In the controller 1511, a file system, a utility program, or a device driver may be performed. The drive mechanism 523 may be controlled by the controller 1511.

Figure 16:
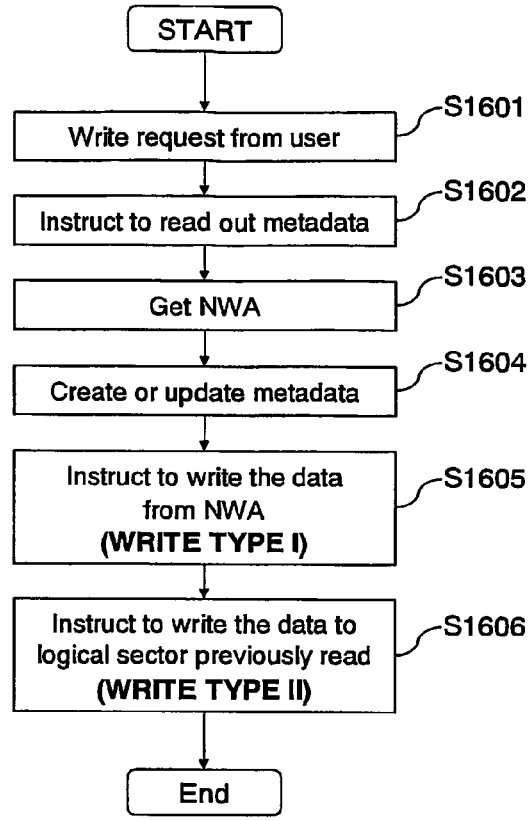
FIG. 16 is a flowchart illustrating a procedure to write the data on a write-once optical disc by the recording/reproduction system explained in FIG. 15.
Figure 16:
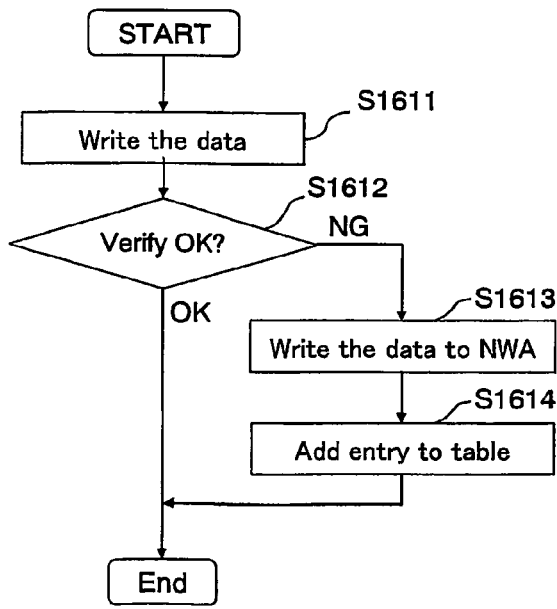
Figure 16:
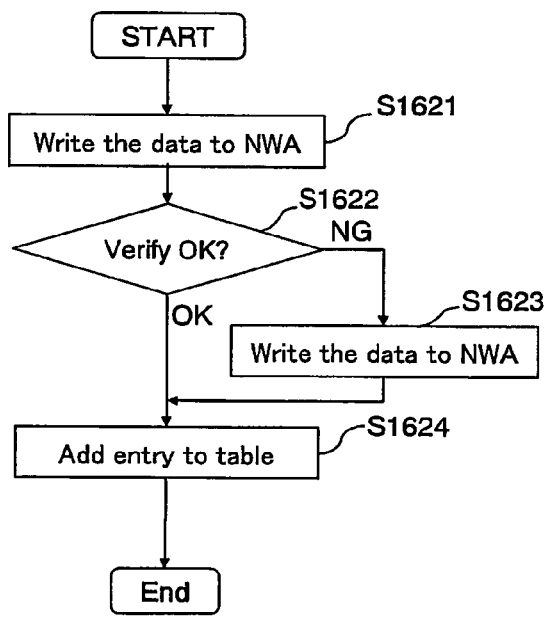

FIG. 16 is a flowchart illustrating a procedure to write the data on a write-once optical disc by the recording/reproduction system explained in FIG. 15.

In step S1601, the controller 1511 receives the request from the user. For example, the request is to replace Data-A file as new data or to copy Data-B file form the other media to the root directory on this disc. The data to be written is transferred to the memory 1512 and the destination to record the data is indicated by the pathname in the directory tree structure.

In step S1602, the controller 1511 reads the data to retrieve the directory or file which is requested by the user. The metadata such as file entry and directory are read from the Metadata File.

In step S1603, the file system gets the NWA before writing the data.

In step S1604, in response to the user requests, the controller 1511 creates some of the metadata so that the data amount to be overwritten is minimized by distinguishing the type of the data to be written. As described in the explanation for FIG. 13, in the case that a file is updated, the file system creates the file entry to specify the location of the data to be written. This file entry is the data to be overwritten. In the case of a new file is recorded under the directory, the file system creates the file entry of the new file and updates the directory to register the new file and the file entry of the directory. The file entry of the directory is the data to be overwritten and the other data is the data which can be written without being overwritten. The data type is distinguished as type I: no need to be overwritten and type II: needs to be overwritten.

In step S1605, the controller 1511 instructs to write the type I data into the logical sector from the NWA. The procedure then proceeds to step S1611 which is the operation to write the data of type I.

In step S1606, the controller 1511 instructs to write the type II data into the logical sector. The procedure then proceeds to step S1621 to perform the operation to overwrite the data in the logical sector. The write command instructed to write the data may be different for type I and II.

In step S1611, the data is written to the physical sector which corresponds to the logical sector specified by the first write command.

In step S1612, the drive mechanism 523 reads out the data written in the previous step and checks whether the data was written correctly as a verification step. If the data was not written correctly, the procedure proceeds to step S1613, otherwise the procedure proceeds to step S1606 as the step S1605 is done.

In step S1613, the drive mechanism 523 writes the data into the unrecorded physical sector, especially to the NWA, which is not the physical sector in which verification of the written data is not successful. The unrecorded physical is selected form the plurality of physical sectors corresponding to the plurality of logical sectors in the volume space.

In step S1614, the drive mechanism 523 creates the remapping table including remapping information which remaps an original address of the physical sector corresponding to the logical sector specified by the first write command to a remapping address of the selected physical sector and stores the remapping information to the defect list/remapping table. Later, the drive apparatus will write the defect/remap list to the NWA.

In step S1621, the data is logically overwritten in the logical sector and physically written into the other unrecorded physical sector, especially to the NWA. The unrecorded sector is selected from the plurality of physical sectors corresponding to the plurality of logical sectors in the volume space.

In step S1622, the drive mechanism 523 reads out the data written in the previous step and checks whether the data was written correctly as a verification step. If the data was not written correctly the procedure proceeds to step S1623, otherwise the procedure proceeds to step S1624.

In step S1623, the drive mechanism 523 writes the data to the unrecorded physical sector other than the physical sector in which the verification of the written data is not successful. The unrecorded physical sector is selected from the plurality of physical sectors corresponding to the plurality of logical sectors in the volume space.

In step S1624, the drive mechanism 523 creates the remapping table including remapping information which remaps an original address of the physical sector corresponding to the logical sector specified by the second write command to a remapping address of the selected physical sector, and stores the remapping information to the defect list/remapping table on the write-once disc.

Figure 17:
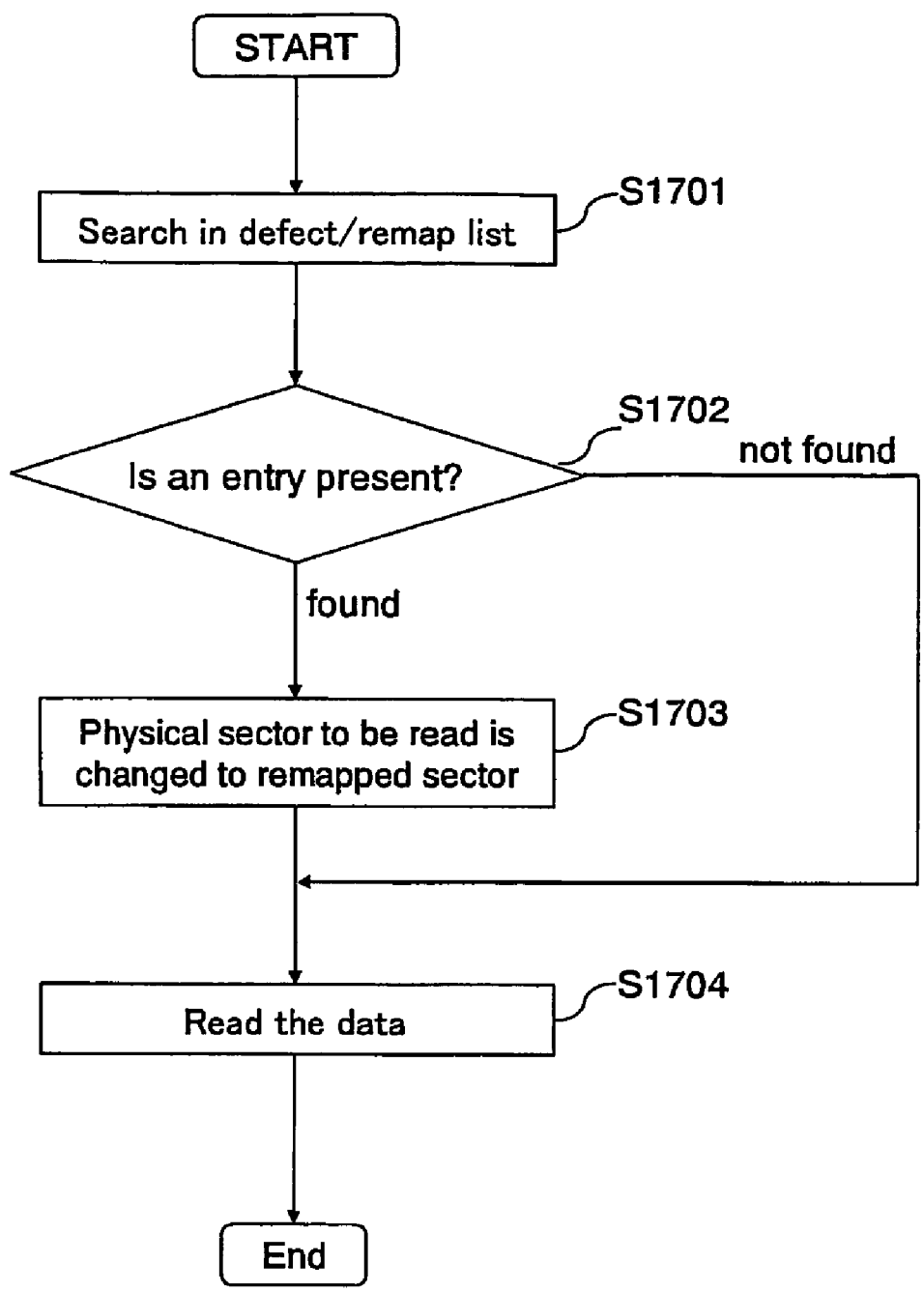
FIG. 17 is a flowchart illustrating a procedure to read the data from a write-once optical disc by the recording/reproduction system explained in FIGS. 5 and 15.

The reproduction procedure from the write-once disc on which disc the data is written using the above explained methods of FIGS. 14A, 14B and 16 is explained hereinafter. FIG. 17 is a flowchart illustrating a procedure to read the data from a write-once optical disc by the recording/reproduction system explained in FIGS. 5 and 15. Wherein, the recording/reproduction system receives a read instruction which specifies at least a logical sector from which data is to be read.

In step S1701, the original addresses of all entries stored in the remapping table are searched. As the logical sector number to be read is instructed, the physical sector number which corresponds to the logical sector in advance is used to search the entry which indicates the physical sector is remapped. When the remapping is performed on an ECC block basis, the start address of the ECC block is registered in the entry. In this case, it is checked whether the physical sector number belongs to the remapped ECC block or not. This operation may be done by a drive apparatus in case of an Information recording/reproduction system as described in FIG. 5.

In step S1702, if the entry is found, the procedure goes to step S1703, other the procedure goes to step S1704.

In step S1703, the original address of the physical sector is replaced with the remapping address of the physical sector, which is indicated in the found entry. If the entry is not found in step S1702, then the address to be read is determined as the address of the physical sector corresponding to the logical sector specified by the read instruction. If the entry is found in S1702, then the address to be read is determined as the remapping address corresponding to the original address found in the remapping table.

In step S1704, the data is read at the determined address.

As explained above, when the address is not found, the data is read from the physical sector corresponding to the logical sector in advance, because the remapping table shows the data stored in the logical sector is not remapped to the other physical sector.

When the address is found, the data is read from the physical sector specified by the remapping address in the found remapping information, because the entry found in the remapping table shows the data stored in the logical sector is remapped.

If the data is remapped within the volume space, especially to the NWA in the track rather than into the spare area, the data can be read out more quickly.

A read-only drive for DVD discs and CD discs requires that the area to be read out must be recorded continuously. This is because the optical pick-up in the read-only drive apparatus may not be able to access the area if there is an unrecorded area in the area. Hereinafter, a method is described so that such a read-only drive can read the pseudo-overwritable discs.

Figure 18A:
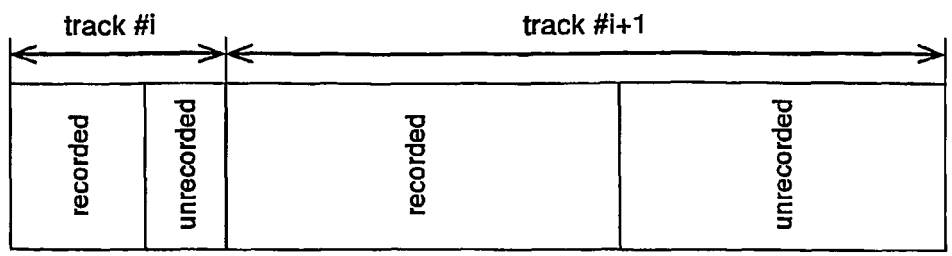
FIGS. 18A and 18B each comprise a diagram illustrating the area on the write-once disc, showing an operation by the drive apparatus to be in the read-only drive readable state.
Figure 18B:
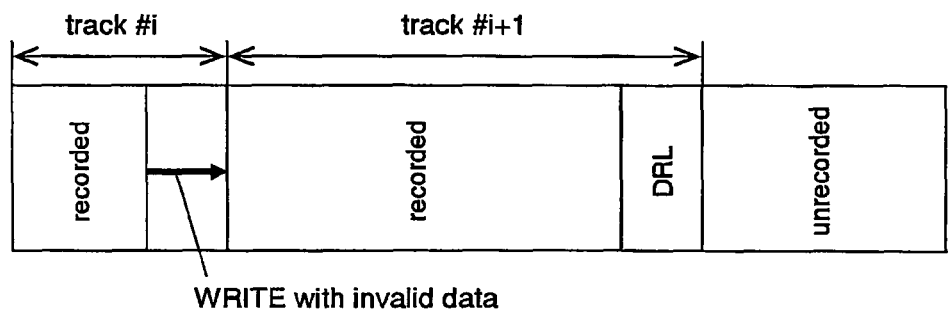

FIGS. 18A and 18B are diagrams illustrating the area on the write-once disc, and show the operation by the drive apparatus to be in the read-only drive readable state. In FIG. 18A, there are two reserved state tracks; track #i and #i+1. When the disc is closed, the unrecorded area in the reserved state tracks, except for the last reserved state track, is recorded, and the last track is reduced until the end of the recorded area. The closed state is described in FIG. 18B. In track #i, invalid data (e.g., dummy data) is recorded into the unrecorded area and the track #i becomes a used state. In the last track #i+1, the defect/remap list is recorded at NWA, as the defect/remap list has to be read by not only the recordable drive, but also the read-only drive. The defect/remap list may be recorded more than one time for robustness, and may also be recorded in the unrecorded area in track #i.

Figure 19A:
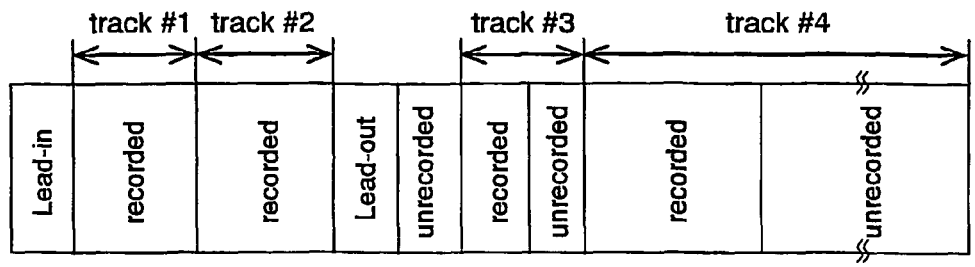
FIGS. 19A and 19B each comprise a diagram illustrating the area on the write-once disc, showing an operation by the drive apparatus to record a Lead-in area and a Lead-out area.
Figure 19B:
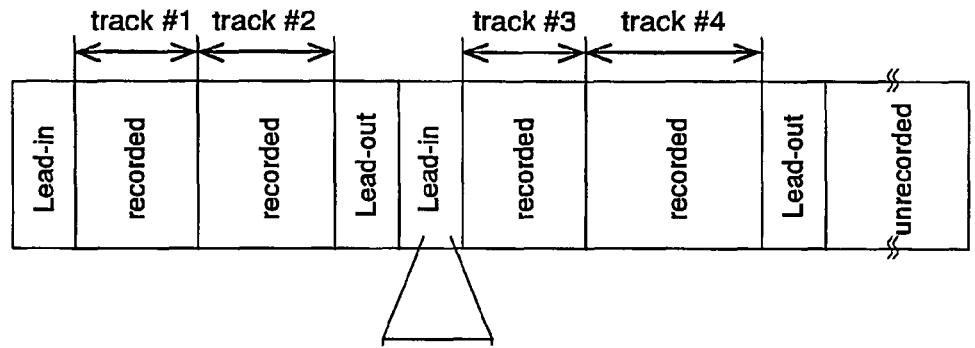

FIGS. 19A and 19B are diagrams illustrating the area on the write-once disc and show the operation by the drive apparatus to record a Lead-in area and a Lead-out area. In case of Multi-border, the Lead-in area is a Border-in area, and the Lead-out area is a Border-out area. When the disc is recorded using multi-session, the read-only drive requires the Lead-in area and the Lead-out area for each session. When the optical pick-up in the read-only drive accesses the last address of the last track, the predetermined size of the recorded area is placed after the last address to prevent the optical pick-up over-run. The location of the defect/remap list is pointed to by the information stored in DMA. For the read-only drive, a specific area is assigned within the Lead-in area and/or the Lead-out area each session, and the location of defect/remap list is stored in the specific area. As shown in FIG. 19A, in the first session the Lead-in area, track #1 and #2, and the Lead-out area are recorded, because the second session track #3 and #4 are reserved. As shown in FIG. 19B, when the disc is closed, the unrecorded area in the track #3, the Lead-in area and the Lead-out area are recorded. In this example, the defect/remap list is stored within the Lead-in area to save the area in track #4. The defect/remap list may be stored in the Lead-out area.

Figure 20A:
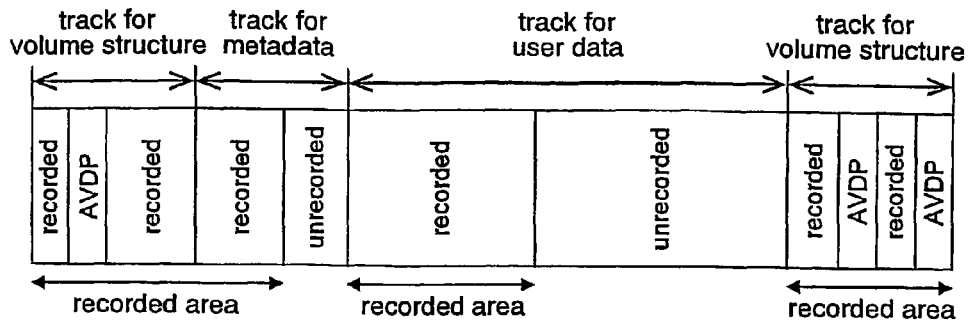
FIGS. 20A and 20B each comprise a diagram illustrating the area on the write-once disc, showing an operation to record 2nd and 3rd Anchor Volume Descriptor Pointers.
Figure 20B:
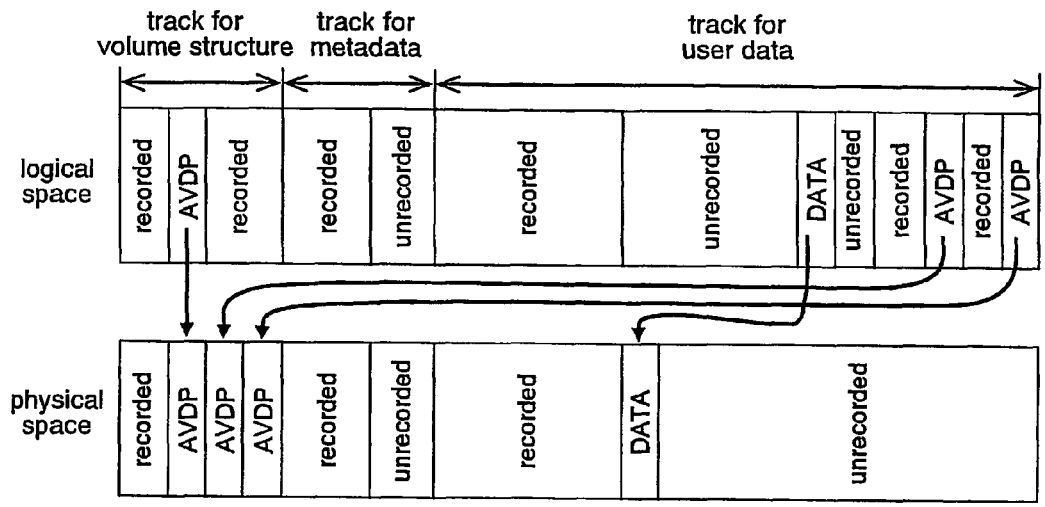

FIGS. 20A and 20B are diagrams illustrating the area on the write-once disc, and show the operation to record 2nd and 3rd Anchor Volume Descriptor Pointers. ECMA 167 standard requires Anchor Volume Descriptor Pointers (hereinafter called AVDP) to be recorded in at least two locations of three; LSN 256, last LSN-256 and last LSN. In the case that AVDP is recorded at last LSN-256 or last LSN, if a user requires to close the disc, all of the unrecorded areas in the volume space has to be recorded for the read-only drive's readable state. After that, any additional user data cannot be recorded on the disc.

To solve this problem, AVDPs located at last LSN-256 and last LSN are remapped within the reserved track, for example these AVDPs are remapped within the track reserved to write the volume structure. By this remapping, the end portion of the volume space can be kept in an unrecorded state. Therefore, even if the disc is closed, the disc can be reopened to write the additional data.

As shown in FIG. 20A, at the time of formatting, volume structure is recorded at the first reserved track and the last reserved track. Wherein as main and reserved volume descriptor sequences may be recorded in the first track, at least one AVDP has to be recorded in the last track. When the pseudo-overwrite method is applied for this disc, at least two tracks are reserved for metadata recording and user data recording. The user data of the file is recorded in the user data track, and the metadata including directories and file entries are recorded in metadata track. When a user requires to close the disc so as to be in a read-only drive readable state, all of the unrecorded areas have to be recorded, because the last LSN was recorded physically.

As shown in FIG. 20B, such a problem will be avoided by using pseudo-overwrite. When the volume structure is recorded, the file system issues a write command to last LSN-256 and last LSN to write AVDPs. As this write command is issued at the last part of the track, not the NWA, the drive apparatus remaps the data to the NWA in the same track or the other track. In the case shown in FIG. 20B, the data is recorded in the track for volume structure. To apply this method, the read-only drive can access to last LSN-256 or last LSN, because these data are recorded in the inner area on physical space. Using this method, not only the last part of volume space, but any other part of volume space, can also be recorded on sequential recording media. As shown in this figure, "DATA" can also be remapped to the NWA.

As described in the above embodiments, this invention can be applied to the drive apparatus on the assumption that the file system minimizes the data amount to be overwritten and the file system instructs to write the data to unrecorded sector by querying the drive apparatus, when the data is written without being overwritten.

INDUSTRIAL APPLICABILITY

The present invention is useful to provide a recording method and apparatus for a write-once disc using a logical overwritable mechanism, a reproduction method and apparatus, and a semiconductor integrated circuit for use in the recording apparatus or the reproduction apparatus.

The invention claimed is:

1. A recording method for writing data on a write-once disc,
the write-once disc having a plurality of physical sectors, the write-once disc including a volume space having a plurality of logical sectors, each of the plurality of logical sectors corresponding to one of the plurality of physical sectors,
the recording method comprising the steps of:
(a) receiving a write instruction which specifies at least a logical sector in which data is to be written;
(b) determining whether the logical sector specified by the write instruction corresponds to a recorded physical sector or an unrecorded physical sector;
(c) when it is determined that the logical sector specified by the write instruction corresponds to an unrecorded physical sector,
(c1) writing the data into the unrecorded physical sector,
(c2) determining whether a verification of the data which has been written into the previously unrecorded physical sector of (c1) is successful,
(c3) when it is determined that the verification of the data that has been written in (c1) is not successful,
(c31) writing the data into an unrecorded physical sector other than the previously unrecorded physical sector of (c1) in which the verification of the written data is not successful, the unrecorded physical sector being selected from the plurality of physical sectors corresponding to the plurality of logical sectors in the volume space,
(c32) generating a remapping table including remapping information which remaps an original address of the physical sector corresponding to the logical sector specified by the write instruction to a remapping address of the selected previously unrecorded physical sector of (c31), and
(c33) writing the remapping table on the write-once disc; and
(d) when it is determined that the logical sector specified by the write instruction corresponds to a recorded physical sector,
(d1) writing the data into an unrecorded physical sector other than the recorded physical sector corresponding to the logical sector specified by the write instruction, the unrecorded physical sector being selected from the plurality of physical sectors corresponding to the plurality of logical sectors in the volume space,
(d2) determining whether a verification of the data which has been written into the selected previously unrecorded physical sector of (d1) is successful,
(d3) when it is determined that the verification of the data that has been written in (d1) is not successful,
(d31) writing the data into another unrecorded physical sector other than the selected previously unrecorded physical sector of (d1) in which the verification of the written data is not successful, the another unrecorded physical sector being selected from the plurality of physical sectors corresponding to the plurality of logical sectors in the volume space,
(d32) generating a remapping table including remapping information which remaps an original address of the physical sector corresponding to the logical sector specified by the write instruction to a remapping address of the another selected previously unrecorded physical sector of (d31), and
(d33) writing the remapping table on the write-once disc.

2. A recording method according to claim 1, wherein:
the data is written sequentially in a track assigned on the write-once disc, the track having a plurality of physical sectors, and
the selected unrecorded physical sector is a physical sector designated by a next writable address within a track.

3. A recording method according to claim 2, further comprising the steps of:
receiving a query for the next writable address within a track; and providing information indicating the next writable address within a track in response to the query.

4. A recording method according to claim 1, wherein:
the remapping table is included in at least a part of a defect list which describes at least one defective physical sector.

5. A recording method according to claim 4, wherein:
the defect list is written into an unrecorded physical sector corresponding to a logical sector in the volume space.

6. A recording method according to claim 1, further comprising the step of allocating at least one of a border-in area and a border-out area in the volume space, and
wherein the defect list is written into the at least one of the border-in area and the border-out area allocated in the volume space.

7. A recording apparatus for writing data on a write-once disc,
the write-once disc having a plurality of physical sectors, the write-once disc including a volume space having a plurality of logical sectors, each of the plurality of logical sectors corresponding to one of the plurality of physical sectors,
the recording apparatus comprising:
a drive mechanism for performing a recording operation for the write-once disc; and
a drive control section for controlling the drive mechanism;
wherein:
the drive control section is operable to:
(a) receive a write instruction which specifies at least a logical sector in which data is to be written; and
(b) determine whether the logical sector specified by the write instruction corresponds to a recorded physical sector or an unrecorded physical sector;
(c) when it is determined that the logical sector specified by the write instruction corresponds to an unrecorded physical sector, the drive control section controls the drive mechanism to:
(c1) write the data into the unrecorded physical sector, and
(c2) determine whether a verification of the data which has been written into the previously unrecorded physical sector of (c1) is successful,
(c3) when it is determined that the verification of the data that has been written in (c1) is not successful, the drive control section controls the drive mechanism to:
(c31) write the data into an unrecorded physical sector other than the previously unrecorded physical sector of (c1) in which the verification of the written data is not successful, the unrecorded physical sector being selected from the plurality of physical sectors corresponding to the plurality of logical sectors in the volume space,
(c32) generate a remapping table including remapping information which remaps an original address of the physical sector corresponding to the logical sector specified by the write instruction to a remapping address of the selected previously unrecorded physical sector of (c1), and
(c33) write the remapping table on the write-once disc; and
(d) when it is determined that the logical sector specified by the write instruction corresponds to a recorded physical sector, the drive control section controls the drive mechanism to:
(d1) write the data into an unrecorded physical sector other than the recorded physical sector corresponding to the logical sector specified by the write instruction, the unrecorded physical sector being selected from the plurality of physical sectors corresponding to the plurality of logical sectors in the volume space, and
(d2) determine whether a verification of the data which has been written into the selected previously unrecorded physical sector of (d1) is successful,
(d3) when it is determined that the verification of the data that has been written in (d1) is not successful, the drive control section controls the drive mechanism to:
(d31) write the data into another unrecorded physical sector other than the selected previously unrecorded physical sector of (d1) in which the verification of the written data is not successful, the another unrecorded physical sector being selected from the plurality of physical sectors corresponding to the plurality of logical sectors in the volume space,
(d32) generate a remapping table including remapping information which remaps an original address of the physical sector corresponding to the logical sector specified by the write instruction to a remapping address of the another selected previously unrecorded physical sector of (d31), and
(d33) write the remapping table on the write-once disc.

8. A system controller including:
a semiconductor integrated circuit and a memory for use in a recording apparatus for writing data on a write-once disc,
the write-once disc having a plurality of physical sectors, the write-once disc including a volume space having a plurality of logical sectors, each of the plurality of logical sectors corresponding to one of the plurality of physical sectors,
the semiconductor integrated circuit in the system controller is configured to control a drive mechanism for performing a recording operation for the write-once disc,
the semiconductor integrated circuit is operable to:
(a) receive a write instruction which specifies at least a logical sector in which data is to be written; and
(b) determines whether the logical sector specified by the write instruction corresponds to a recorded physical sector or an unrecorded physical sector;
(c) when it is determined that the logical sector specified by the write instruction corresponds to an unrecorded physical sector, the semiconductor integrated circuit controls the drive mechanism to:
(c1) write the data into the unrecorded physical sector,
(c2) determine whether a verification of the data which has been written into the previously unrecorded physical sector of (c1) is successful,
(c3) when it is determined that the verification of the data that has been written in (c1) is not successful, the semiconductor integrated circuit controls the drive mechanism to:
(c31) write the data into an unrecorded physical sector other than the previously unrecorded physical sector of (c1) in which the verification of the written data is not successful, the unrecorded physical sector being selected from the plurality of physical sectors corresponding to the plurality of logical sectors in the volume space,
(c32) generate a remapping table including remapping information which remaps an original address of the physical sector corresponding to the logical sector specified by the write instruction to a remapping address of the selected previously unrecorded physical sector of (c31), and (c33) write the remapping table on the write-once disc; and (d) when it is determined that the logical sector specified by the write instruction corresponds to a recorded physical sector, the semiconductor integrated circuit controls the drive mechanism to:

(d1) write the data into an unrecorded physical sector other than the recorded physical sector corresponding to the logical sector specified by the write instruction, the unrecorded physical sector being selected from the plurality of physical sectors corresponding to the plurality of logical sectors in the volume space, and (d2) determine whether a verification of the data which has been written into the selected previously unrecorded physical sector of (d1) is successful, (d3) when it is determined that the verification of the data that has been written in (d1) is not successful, the semiconductor integrated circuit controls the drive mechanism to, (d31) write the data into another unrecorded physical sector other than the selected previously unrecorded physical sector of (d1) in which the verification of the written data is not successful, the another unrecorded physical sector being selected from the plurality of physical sectors corresponding to the plurality of logical sectors in the volume space, (d32) generate a remapping table including remapping information which remaps an original address of the physical sector corresponding to the logical sector specified by the write instruction to a remapping address of the another selected previously unrecorded physical sector of (d31), and (d33) write the remapping table on the write-once disc.

9. A recording method for writing data on a write-once disc, the write-once disc having a plurality of physical sectors, the write-once disc including a volume space having a plurality of logical sectors, each of the plurality of logical sectors corresponding to one of the plurality of physical sectors, the recording method comprising the steps of:

(a) in response to a first write instruction which specifies at least a logical sector in which data is to be written, (a1) writing the data into the physical sector corresponding to the logical sector specified by the first write instruction, (a2) determining whether a verification of the data which has been written into the previously unrecorded physical sector of (a1) is successful, (a3) when it is determined that the verification of the data that has been written in (a1) is not successful, (a31) writing the data into an unrecorded physical sector other than the previously unrecorded physical sector of (a1) in which the verification of the written data is not successful, the unrecorded physical sector being selected from the plurality of physical sectors corresponding to the plurality of logical sectors in the volume space, (a32) generating a remapping table including remapping information which remaps an original address of the physical sector corresponding to the logical sector specified by the first write instruction to a remapping address of the selected previously unrecorded physical sector of (a31), and (a33) writing the remapping table on the write-once disc; and (b) in response to a second write instruction which specifies at least a logical sector in which data is to be written, (b1) writing the data into an unrecorded physical sector other than the physical sector corresponding to the logical sector specified by the second write instruction, the unrecorded physical sector being selected from the plurality of physical sectors corresponding to the plurality of logical sectors in the volume space, (b2) determining whether a verification of the data which has been written into a the selected previously unrecorded physical sector of (b1) is successful, (b3) when it is determined that the verification of the data that has been written in (b1) is not successful, (b31) writing the data into another unrecorded physical sector other than the selected previously unrecorded physical sector of (b1) in which the verification of the written data is not successful, the another unrecorded physical sector being selected from the plurality of physical sectors corresponding to the plurality of logical sectors in the volume space, (b32) generating a remapping table including remapping information which remaps an original address of the physical sector corresponding to the logical sector specified by the second write instruction to a remapping address of the another selected previously unrecorded physical sector of (b31), and (b33) writing the remapping table on the write-once disc.

10. A recording apparatus for writing data on a write-once disc, the write-once disc having a plurality of physical sectors, the write-once disc including a volume space having a plurality of logical sectors, each of the plurality of logical sectors corresponding to one of the plurality of physical sectors, the recording apparatus comprising:

a drive mechanism for performing a recording operation for the write-once disc; and a drive control section for controlling the drive mechanism;

wherein:

the drive control section is operable to:

(a) in response to a first write instruction which specifies at least a logical sector in which data is to be written, the drive control section controls the drive mechanism to:

(a1) write the data into the physical sector corresponding to the logical sector specified by the first write instruction, and (a2) determine whether a verification of the data which has been written into the previously unrecorded physical sector of (a1) is successful, (a3) when it is determined that the verification of the data that has been written in (a1) is not successful, the drive control section controls the drive mechanism to:

(a31) write the data into an unrecorded physical sector other than the previously unrecorded physical sector of (a1) in which the verification of the written data is not successful, the unrecorded physical sector being selected from the plurality of physical sectors corresponding to the plurality of logical sectors in the volume space, (a32) generate a remapping table including remapping information which remaps an original address of the physical sector corresponding to the logical sector specified by the first write instruction to a remapping address of the selected previously unrecorded physical sector of (a31), and (a33) write the remapping table on the write-once disc; and (b) in response to a second write instruction which specifies at least a logical sector in which data is to be written, the drive control section controls the drive mechanism to:

(b1) write the data into an unrecorded physical sector other than the physical sector corresponding to the logical sector specified by the second write instruction, the unrecorded physical sector being selected from the plurality of physical sectors corresponding to the plurality of logical sectors in the volume space, and (b2) determine whether a verification of the data which has been written into the selected previously unrecorded physical sector of (b1) is successful, (b3) when it is determined that the verification of the data has been written in (b1) is not successful, the drive control section controls the drive mechanism to:

(b31) write the data into another unrecorded physical sector other than the selected previously unrecorded physical sector of (b1) in which the verification of the written data is not successful, the another unrecorded physical sector being selected from the plurality of physical sectors corresponding to the plurality of logical sectors in the volume space, (b32) generate a remapping table including remapping information which remaps an original address of the physical sector corresponding to the logical sector specified by the second write instruction to a remapping address of the another selected previously unrecorded physical sector of (b31), and (b33) write the remapping table on the write-once disc.

11. A system controller including:

a semiconductor integrated circuit and a memory for use in a recording apparatus for writing data on a write-once disc, the write-once disc having a plurality of physical sectors, the write-once disc including a volume space having a plurality of logical sectors, each of the plurality of logical sectors corresponding to one of the plurality of physical sectors, the semiconductor integrated circuit in the system controller is configured to control a drive mechanism for performing a recording operation for the write-once disc, the semiconductor integrated circuit is operable to:

(a) in response to a first write instruction which specifies at least a logical sector in which data is to be written, the semiconductor integrated circuit controls the drive mechanism to:

(a1) write the data into the physical sector corresponding to the logical sector specified by the first write instruction, and (a2) determine whether a verification of the data which has been written into the previously unrecorded physical sector of (a1) is successful, (a3) when it is determined that the verification of the data has been written in (a1) is not successful, the semiconductor integrated circuit controls the drive mechanism to:

(a31) write the data into an unrecorded physical sector other than the previously unrecorded physical sector of (a1) in which the verification of the written data is not successful, the unrecorded physical sector being selected from the plurality of physical sectors corresponding to the plurality of logical sectors in the volume space, (a32) generating a remapping table including remapping information which remaps an original address of the physical sector corresponding to the logical sector specified by the first write instruction to a remapping address of the selected previously unrecorded physical sector of (a31), and (a33) writing the remapping table on the write-once disc; and (b) in response to a second write instruction which specifies at least a logical sector in which data is to be written, the semiconductor integrated circuit controls the drive mechanism to:

(b1) write the data into an unrecorded physical sector other than the physical sector corresponding to the logical sector specified by the second write instruction, the unrecorded physical sector being selected from the plurality of physical sectors corresponding to the plurality of logical sectors in the volume space, and (b2) determine whether a verification of the data which has been written into the selected previously unrecorded physical sector of (b1) is successful, (b3) when it is determined that the verification of the data has been written in (b1) is not successful, the semiconductor integrated circuit controls the drive mechanism to:

(b31) write the data into another unrecorded physical sector other than the selected previously unrecorded physical sector of (b1) in which the verification of the written data is not successful, the another unrecorded physical sector being selected from the plurality of physical sectors corresponding to the plurality of logical sectors in the volume space, (b32) generate a remapping table including remapping information which remaps an original address of the physical sector corresponding to the logical sector specified by the second write instruction to a remapping address of the another selected previously unrecorded physical sector of (b31), and (b33) write the remapping table on the write-once disc.

* * * * *